(12) United States Patent
Yamane et al.

(10) Patent No.: US 8,947,517 B2
(45) Date of Patent: Feb. 3, 2015

(54) MICROSCOPE CONTROL DEVICE, IMAGE MANAGEMENT SERVER, IMAGE PROCESSING METHOD, PROGRAM, AND IMAGE MANAGEMENT SYSTEM

(75) Inventors: Kenji Yamane, Kanagawa (JP); Naoki Tagami, Tokyo (JP); Yoshihiro Wakita, Tokyo (JP); Masato Kajimoto, Chiba (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 13/169,262

(22) Filed: Jun. 27, 2011

(65) Prior Publication Data

US 2012/0002033 A1     Jan. 5, 2012

(30) Foreign Application Priority Data

Jul. 1, 2010 (JP) .................................. 2010-151391

(51) Int. Cl.
*H04N 7/18* (2006.01)
*G02B 21/36* (2006.01)
*G06F 9/50* (2006.01)
*H04N 19/60* (2014.01)
(Continued)

(52) U.S. Cl.
CPC .............. *G02B 21/365* (2013.01); *G06F 9/505* (2013.01); *H04N 19/00775* (2013.01); *H04N 19/00484* (2013.01); *G06F 2209/509* (2013.01)
USPC .............................. 348/79; 709/206; 396/265

(58) Field of Classification Search
CPC ......... G06F 3/048; G06F 15/16; G06F 11/07; H04N 5/225; H04N 7/18
USPC ........... 348/E07.085, 207.1, E05.024, 42–76, 348/78–92, 270.2; 382/133, 240, 151, 128, 382/307, 284; 378/37; 345/537, 538
See application file for complete search history.

(56) References Cited

U.S. PATENT DOCUMENTS

| 6,031,930 A | 2/2000 | Bacus et al. |
| 6,101,265 A | 8/2000 | Bacus et al. |

(Continued)

FOREIGN PATENT DOCUMENTS

| JP | 2009-63658 | 3/2009 |
| WO | 01/84209 | 11/2001 |
| WO | 01/84209 A2 | 11/2001 |

OTHER PUBLICATIONS

European Patent Office, Partial European Search Report, issued in connection with European Patent Application No. 11169435.2, mailed on Oct. 10, 2011. (6 pages).

(Continued)

*Primary Examiner* — Dave Czekaj
*Assistant Examiner* — Dramos I Kalapodas
(74) *Attorney, Agent, or Firm* — K&L Gates LLP

(57) ABSTRACT

A microscope control device includes a driving control unit that controls driving of a microscope which captures a digital enlarged image of a predetermined sample and outputs the corresponding digital enlarged image to an external server, a digital work processing unit that performs a digital work process for the captured digital enlarged image, a load calculation unit that calculates a load which is necessary for the capturing process of the digital enlarged image, and a digital work determination unit that determines whether or not the predetermined digital work process is to be performed by the digital work processing unit based on a load value calculated by the load calculation unit and a load value for the corresponding server obtained from the server.

15 Claims, 22 Drawing Sheets

(51) Int. Cl.
*H04N 19/423* (2014.01)
*H04N 5/225* (2006.01)

(56) References Cited

U.S. PATENT DOCUMENTS

| | | | |
|---|---|---|---|
| 6,226,392 B1 | 5/2001 | Bacus et al. | |
| 6,272,235 B1 | 8/2001 | Bacus et al. | |
| 6,396,941 B1 | 5/2002 | Bacus et al. | |
| 6,404,906 B2 | 6/2002 | Bacus et al. | |
| 6,522,774 B1 | 2/2003 | Bacus et al. | |
| 6,674,881 B2 | 1/2004 | Bacus et al. | |
| 6,674,884 B2 | 1/2004 | Bacus et al. | |
| 6,775,402 B2 | 8/2004 | Bacus et al. | |
| 7,110,586 B2 | 9/2006 | Bacus et al. | |
| 7,146,372 B2 | 12/2006 | Bacus et al. | |
| 7,149,332 B2 | 12/2006 | Bacus et al. | |
| 7,292,251 B1 * | 11/2007 | Gu et al. | 345/555 |
| 7,542,596 B2 | 6/2009 | Bacus et al. | |
| 7,711,174 B2 * | 5/2010 | Sammak et al. | 382/133 |
| 7,856,131 B2 | 12/2010 | Bacus et al. | |
| 7,920,736 B2 * | 4/2011 | Sammak et al. | 382/133 |
| 8,341,548 B2 * | 12/2012 | Ernst et al. | 715/792 |
| 8,625,920 B2 * | 1/2014 | Bacus et al. | 382/255 |
| 2004/0236805 A1 * | 11/2004 | Gordon | 707/205 |
| 2005/0254696 A1 | 11/2005 | Bacus et al. | |
| 2006/0055782 A1 * | 3/2006 | Silverbrook et al. | 348/207.2 |
| 2006/0204236 A1 * | 9/2006 | Sasaki et al. | 396/265 |
| 2007/0288974 A1 * | 12/2007 | Creamer et al. | 725/105 |
| 2008/0133271 A1 * | 6/2008 | Chang | 705/3 |
| 2008/0184254 A1 * | 7/2008 | Bernard et al. | 718/105 |
| 2008/0247004 A1 * | 10/2008 | Yeung | 358/486 |
| 2009/0248821 A1 * | 10/2009 | Ariga | 709/206 |

OTHER PUBLICATIONS

European Search Report issued Feb. 16, 2012, for corresponding European Appln. No. 11169435.2.

* cited by examiner

FIG. 4
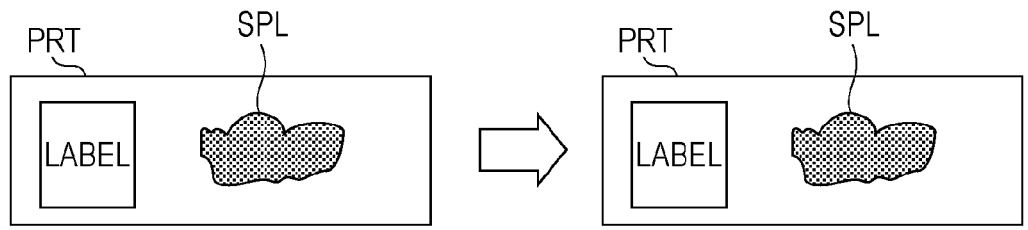
SET IMAGED REGION → NINE CAPTURED IMAGES
| NUMBER OF CAPTURED IMAGES | LOAD VALUE |
|---|---|
| 1 | 0.01 |
| 2 | 0.03 |
| ⋮ | ⋮ |
| 9 | 1.00 |
LOAD PREDICTION TABLE

FIG. 8

IMAGE

| 0 | 1 | 2 | 3 | ... | 898 | 899 |
|---|---|---|---|-----|-----|-----|
| 900 | 901 | 902 | 903 | ... | 1798 | 1799 |
| 1800 | 1801 | 1802 | 1803 | ... | 2698 | 2699 |
| ⋮ ||||||||
|   |   |   |   |   |   |   |

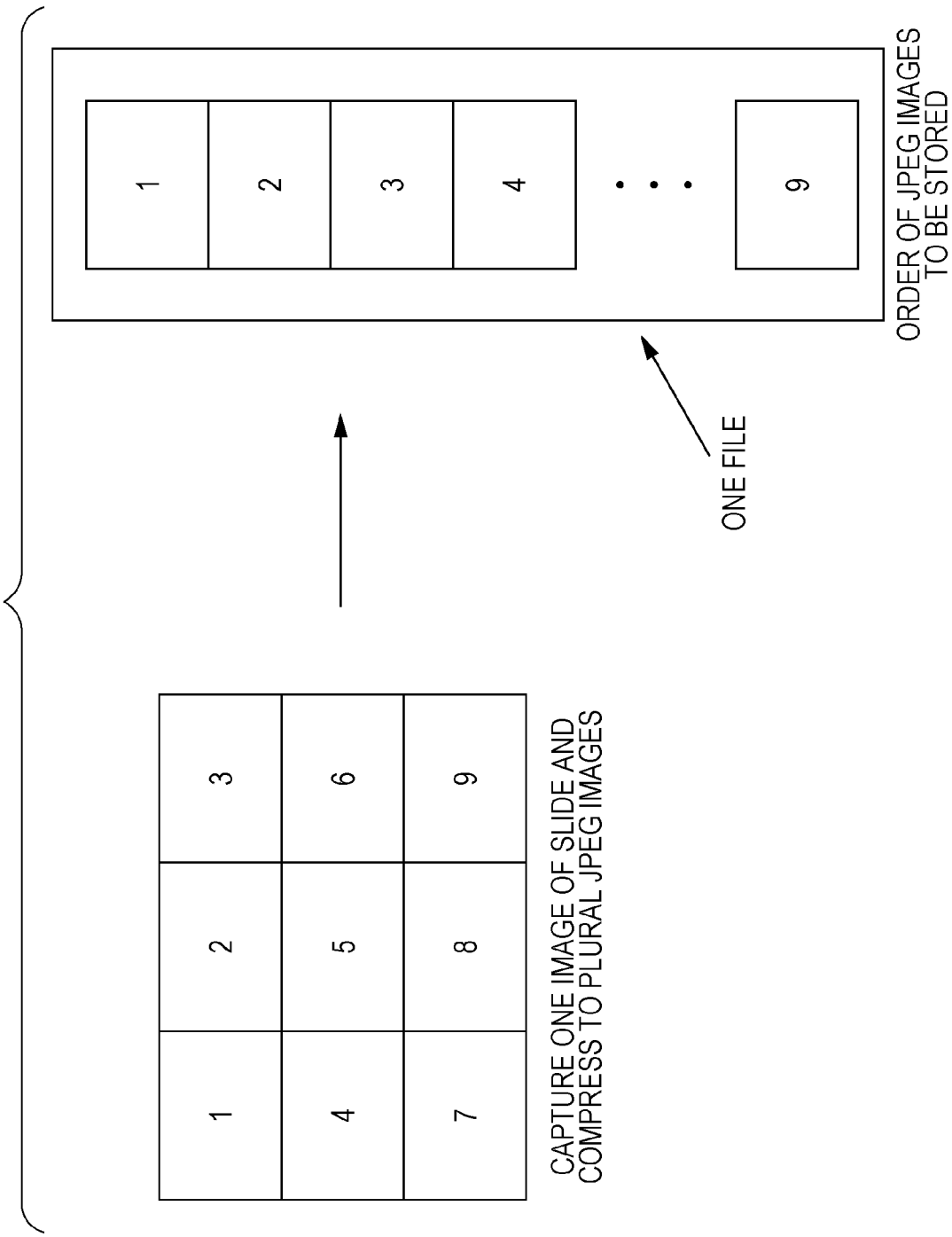

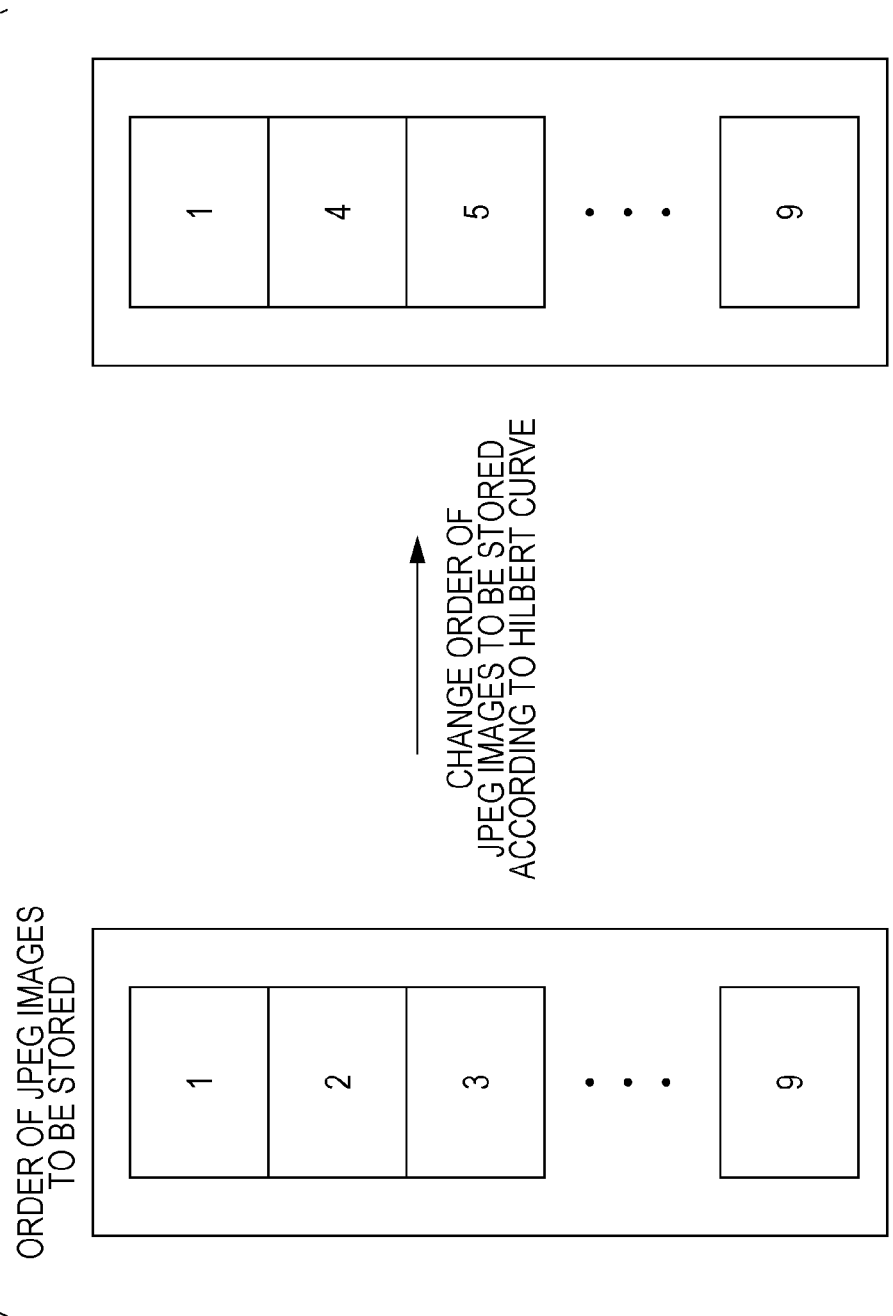

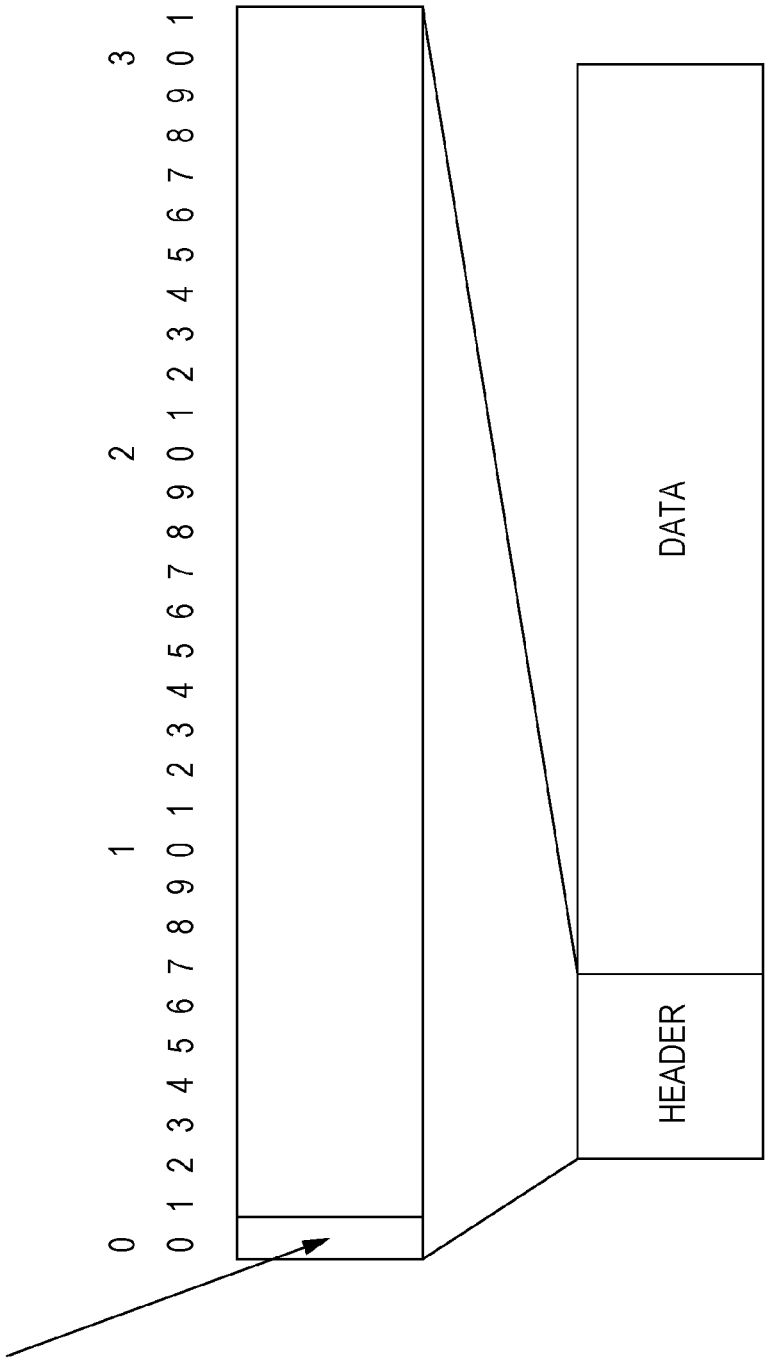

MICROSCOPE CONTROL DEVICE, IMAGE MANAGEMENT SERVER, IMAGE PROCESSING METHOD, PROGRAM, AND IMAGE MANAGEMENT SYSTEM

CROSS REFERENCES TO RELATED APPLICATIONS

The present application claims priority to Japanese Priority Patent Application JP 2010-151391 filed in the Japan Patent Office on Jul. 1, 2010, the entire contents of which are hereby incorporated by reference.

BACKGROUND

The present application relates to a microscope control device, an image management server, an image processing method, a program, and an image management system.

In recent years, a technique has been considered in which an image of a sample which is observed using a microscope is digitalized, and the digitalized image of the sample can be displayed on a display device for observation (for example, refer to Japanese Unexamined Patent Application Publication No. 2009-63658).

If the digitalized images of the sample can be temporarily stored in a server existing on a network, and the stored images can be inspected via the server, it is possible to promote advancements in so-called telepathology where a doctor in a remote location performs a pathological diagnosis using the network.

In such a digital microscope system, in order to read captured images via the server, a procedure is performed in which the microscope is controlled so as to obtain (photograph) a signal from a CCD or a CMOS sensor as digital data, the obtained image data is processed and compressed to data such as JPEG, and the data is uploaded to the server. A person who wants to inspect microscope images operates a terminal (hereinafter, referred to as a viewer) for inspecting the microscope images so as to access the server, and obtains microscope images which are desired to be inspected.

SUMMARY

Here, controls for the microscope performed in the digital microscope system become different depending on imaged samples (subjects), and loads applied to a microscope control device which controls the microscope by controlling a control algorithm such as an exposure time or an automatic focus for imaging the samples, are frequently varied.

Therefore, in a case where a device performing a predetermined digital work process for digital data corresponding to a sample image is defined (for example, the digital work process is fixedly performed in the server, or is fixedly performed in the microscope control device), there is a case where efficiency in the entire processing system is lowered. For this reason, the digital work process is delayed in the entire system, and time is taken until a captured image of a sample is inspected on the viewer that is a terminal.

It is desirable to provide a microscope control device, an image management server, an image processing method, a program, and an image management system, capable of reducing a delay caused by a digital work process and of more rapidly inspecting a sample image captured by a microscope.

According to an embodiment, there is provided a microscope control device including a driving control unit that controls driving of a microscope which captures a digital enlarged image of a predetermined sample and outputs the corresponding digital enlarged image to an external server; a digital work processing unit that performs a digital work process for the captured digital enlarged image; a load calculation unit that calculates a load which is necessary for the capturing process of the digital enlarged image; and a digital work determination unit that determines whether or not the predetermined digital work process is to be performed by the digital work processing unit based on a load value calculated by the load calculation unit and a load value for the corresponding server obtained from the server.

The load calculation unit may calculate a load value necessary for the capturing process of the digital enlarged image based on at least one of a capturing condition for the digital enlarged image obtained from the driving control unit and a load value prediction table provided in advance.

The digital work processing unit may perform a conversion process for the captured digital enlarged image as the digital work process.

The digital enlarged image of the predetermined sample may include a plurality of digital images, and the digital work processing unit may change an arrangement of the plurality of digital images such that the plurality of digital images is positioned substantially at the same distance between each other in a storage region of the server as the digital work process.

The digital work determination unit may request the digital work processing unit to perform the predetermined digital work process if the load value calculated by the load calculation unit is lower than the load value for the server, and the driving control unit may output data for the digital enlarged image having undergone the predetermined digital work process to the server along with identification information indicating that the predetermined digital work process has been performed.

The digital work determination unit may determine that the predetermined digital work process is to be performed by the server if the load value calculated by the load calculation unit is higher than the load value for the server. In addition, the driving control unit may output the data for the digital enlarged image not having undergone the predetermined digital work process to the server along with identification information indicating that the predetermined digital work process has not been performed.

According to another embodiment, there is provided an image management server including an image data storage processing unit that obtains data for a digital enlarged image of a predetermined sample captured by a microscope and stores the obtained data in a predetermined storage region; an image data provision processing unit that provides the data for the digital enlarged image stored in the predetermined storage region to an external device; and a digital work processing unit that performs a predetermined digital work process for the digital enlarged image data having identification information if the identification information indicating that the predetermined digital work process has not been performed is given to the digital enlarged image obtained by the image data storage processing unit.

In addition, the image management server may further include a load calculation unit that calculates a sum total of loads necessary for a data storage process for storing the data for the digital enlarged image, a data provision process for providing the stored data for the digital enlarged image, and performing the predetermined digital work process, and outputs the calculated sum total of the loads to a microscope control device which controls the microscope.

The digital work processing unit may perform a conversion process for the captured digital enlarged image as the digital work process.

The digital enlarged image of the predetermined sample may include a plurality of digital images, and the digital work processing unit may change the arrangement of the plurality of digital images such that the plurality of digital images is positioned substantially at the same distance between each other in the predetermined storage region as the digital work process.

According to still another embodiment, there is provided an image processing method including calculating a load which is necessary for a capturing process of the digital enlarged image corresponding to a predetermined sample by a microscope; obtaining a load for a server which stores the digital enlarged image corresponding to the predetermined sample; and determining whether or not a predetermined digital work process is to be performed for the digital enlarged image based on the calculated load value and the load value for the corresponding server obtained from the server.

According to still another embodiment, there is provided an image processing method including obtaining data for a digital enlarged image of a predetermined sample captured by a microscope; determining whether or not identification information indicating that a predetermined digital work process has not been performed is given to the obtained data for the digital enlarged image; performing a predetermined digital work process for the digital enlarged image having the identification information indicating that the predetermined digital work process has not been performed; and storing data for the digital enlarged image having undergone the predetermined digital work process in a predetermined storage region.

According to still another embodiment, there is provided a program enabling a computer which controls a microscope capturing a digital enlarged image of a predetermined sample, to realize the functions of controlling driving of the microscope and outputting the captured digital enlarged image to an external sever; performing a predetermined digital work process for the captured digital enlarged image; calculating a load necessary for the capturing process of the digital enlarged image; and determining whether or not the predetermined digital work process is to be performed based on a load value calculated by the load calculation function and a load value for the corresponding server obtained from the server.

According to still another embodiment, there is provided a program enabling a computer to realize the functions of obtaining data for a digital enlarged image of a predetermined sample captured by a microscope and storing the obtained data in a predetermined storage region; providing the data for the digital enlarged image stored in the predetermined storage region to an external device; and performing a predetermined digital work process for the digital enlarged image having identification information if the identification information indicating that the predetermined digital work process has not been performed is given to the digital enlarged image data obtained by the image data storage processing unit.

According to still another embodiment, there is a provided an image management system including the microscope control device and the image management server.

Additional features and advantages are described herein, and will be apparent from the following Detailed Description and the figures.

BRIEF DESCRIPTION OF THE FIGURES

FIG. 4 is a diagram illustrating an example of a prediction method of a load value according to the same embodiment.

FIG. 8 is a diagram illustrating tile images according to the same embodiment.

FIG. 11A and 11B are diagrams illustrating an example of a digital work process according to the same embodiment.

FIG. 12 is a diagram illustrating an example of a data structure of microscope image data according to the same embodiment.

DETAILED DESCRIPTION

Embodiments of the present application will be described below in detail with reference to the drawings.

(1) First Embodiment
(1-1) Configuration of Microscope Image Management System
(1-2) Overall Configuration of Microscope
(1-3) Overall Configuration of Microscope Control Device
(1-4) Configuration of Overall Control Unit
(1-5) Format of Uploaded Data (1-6) Configuration of Image Management Server (1-7) Image Processing Method (1-8) Process for Changing Order of Tile Images to be Stored (2) Hardware Configuration of Microscope Control Device and Image Management Server according to Embodiment (3) Conclusion Hereinafter, as a sample imaged by a microscope, a biological sample including a slice of tissue, such as connective tissue such as blood, epithelial tissue, or both types of tissue, or smear cells is described as an example, however the present disclosure is not limited thereto.

First Embodiment: Configuration of Microscope Image Management System

Figure 1:
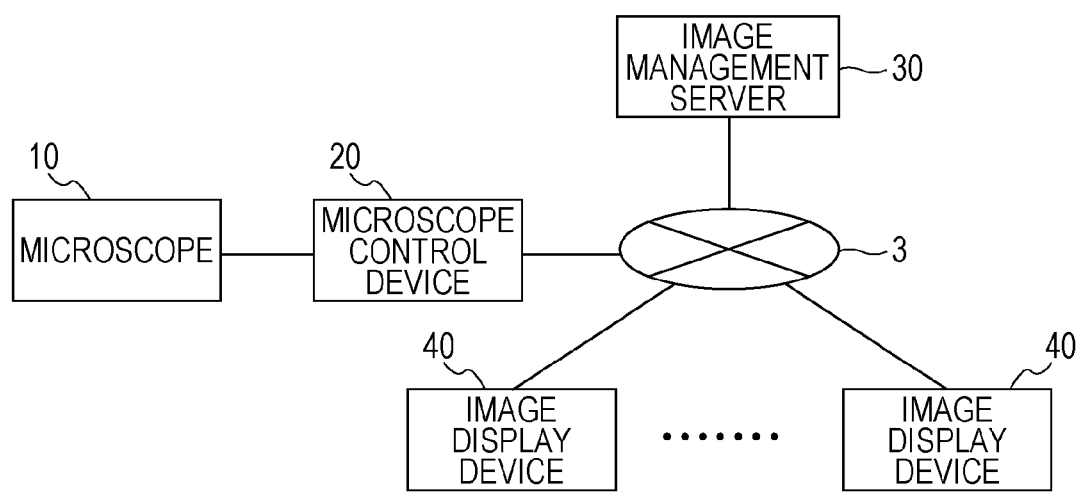
FIG. 1 is a diagram illustrating a configuration of a microscope image management system according to a first embodiment.

First, a configuration of a microscope image management system 1 according to a first embodiment will be described with reference to FIG. 1. FIG. 1 is a diagram illustrating a configuration of the microscope image management system 1 according to this embodiment.

The microscope image management system 1 according to this embodiment includes a microscope 10, a microscope control device 20, an image management server 30, and an image display device 40 as shown in FIG. 1. The microscope control device 20, the image management server 30, and the image display device 40 are connected to each other via a network 3.

The network 3 is a communication network which can connect the microscope control device 20, the image management server 30, and the image display device 40 according to this embodiment to each other so as to communicate in a bidirectional manner. The network 3 includes, for example, a public network such as the Internet, a telephone network, a satellite communication network, or a broadcast line, or a dedicated network such as WAN (Wide Area Network), LAN (Local Area Network), IP-VPN (Internet Protocol-Virtual Private Network), Ethernet (registered trademark), or wireless LAN, and includes wired or wireless networks. In addition, the network 3 may be a communication network dedicated to the microscope image management system 1 according to this embodiment.

The microscope 10 illuminates a sample (for example, a biological sample) placed on a stage of the corresponding microscope 10 with predetermined illumination light, and images the sample using light transmitted therethrough or the sample using light emitted therefrom. An overall configuration of the microscope 10 according to this embodiment will be described below again in detail.

The microscope 10 is controlled to be driven by the microscope control device 20, and a sample image captured by the microscope 10 is stored in the image management server 30 via the microscope control device 20.

The microscope control device 20 controls driving of the microscope 10 which images a sample. The microscope control device 20 controls the microscope 10 to capture a digital image of the sample and performs a predetermined digital work process for the obtained digital image data for the obtained sample. In addition, the microscope control device 20 uploads the obtained digital image data for the sample to the image management server 30. A detailed configuration of the microscope control device 20 will be described below again.

The image management server 30 is a device which stores the digital image data for the sample which has been imaged by the microscope 10, and manages the digital image data. When the digital image data for the sample is output from the microscope control device 20, the image management server 30 stores the obtained digital image data for the sample in a predetermined storage region such that an inspector can use it. Further, the image management server 30 provides digital image data for a corresponding sample to the image display device 40 when an inspector makes a request for inspecting of the digital image data for the sample from the image display device 40 (that is, a device corresponding to the viewer) which is operated by the inspector.

The image management server 30 according to this embodiment may optionally perform a predetermined digital work process for digital image data for a sample which has been imaged by the microscope 10. As described below in detail, the microscope image management system 1 according to this embodiment dynamically changes devices for performing a predetermined digital work process for digital image data, depending on a load circumstance of the microscope control device 20 and the image management server 30.

A detailed configuration of the image management server 30 according to this embodiment will be described below again in detail.

The image display device 40 is a terminal (that is, a device corresponding to the viewer) which is operated by an inspector who wants to inspect digital image data for a sample. The inspector who wants to inspect digital image data refers to a list of digital image data or the like stored in the image management server 30, specifies digital image data which is wanted to be inspected, and requests the image management server 30 to provide the specified digital image data. When the digital image data is provided from the image management server 30, the inspector can inspect the digital image data by displaying an image corresponding to the provided digital image data on a display or the like of the image display device 40.

In FIG. 1, although the case where the microscope 10, the microscope control device 20, and the image management server 30 included in the system 1 respectively existing singly is shown, the number of the microscope 10, the microscope control device 20, and the image management server 30 included in the microscope image management system 1 is not limited to the example shown in FIG. 1, but may be a plurality, respectively.

Overall Configuration of Microscope

Figure 2:
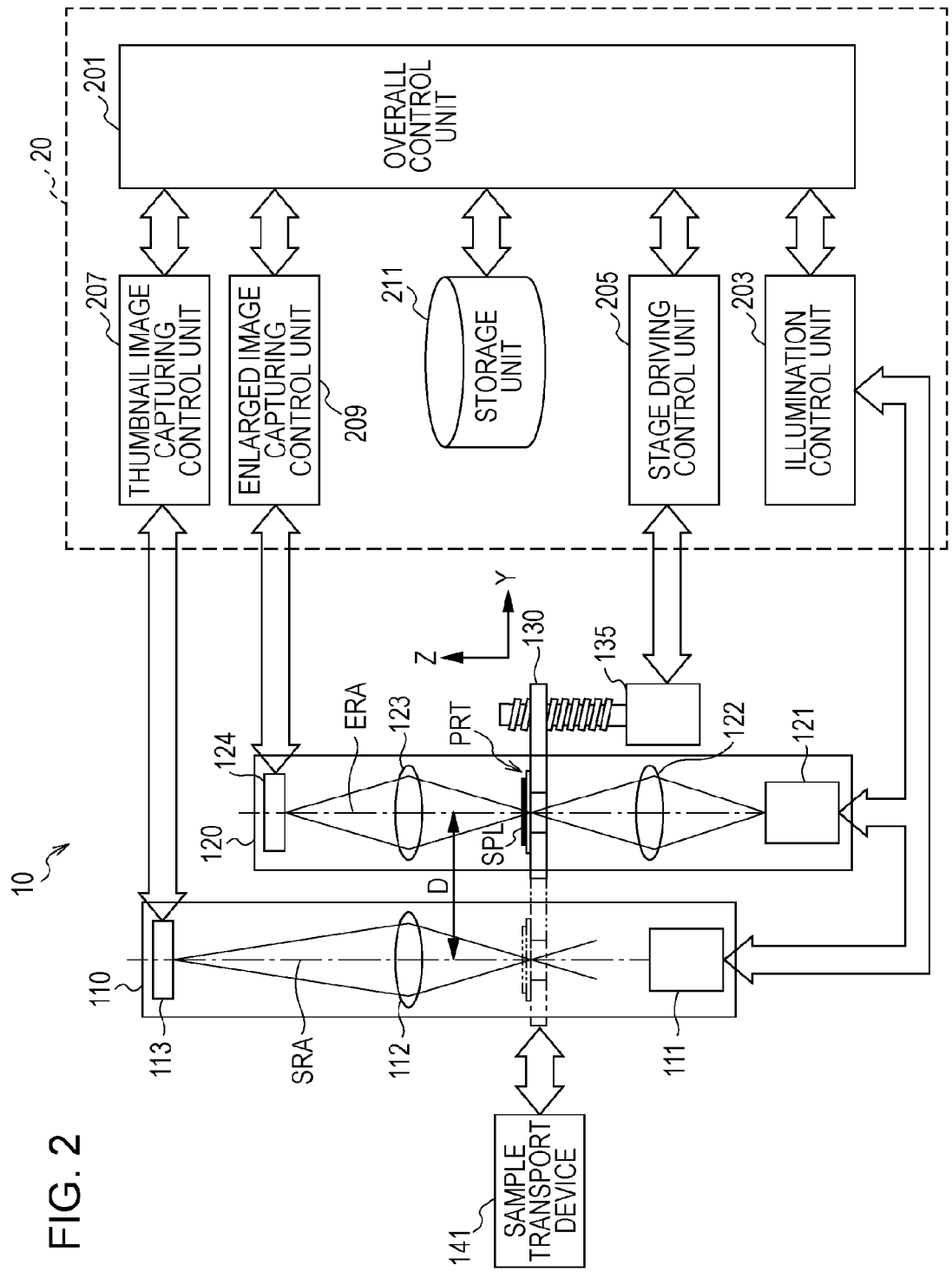
FIG. 2 is a diagram illustrating configurations of a microscope and a microscope control device according to the same embodiment.

Next, with reference to FIG. 2, an overall configuration of the microscope 10 according to this embodiment will be described. FIG. 2 is a diagram illustrating the overall configuration of the microscope 10 and the microscope control device 20 according to this embodiment.

Overall Configuration

The microscope 10 according to this embodiment includes, as exemplified in FIG. 2, a thumbnail image capturing unit 110 which captures the entire image of a preparation PRT (hereinafter, this image is also referred to as a thumbnail image) on which a biological sample SPL is placed, and an enlarged image capturing unit 120 which captures an image to which the biological sample SPL is enlarged at a predetermined magnification (hereinafter, this image is also referred to as an enlarged image).

The preparation PRT fixes a biological sample SPL including a slice of tissue such as connective tissue such as blood, epithelial tissue, or both types of tissue, or smear cells, to a microscope slide by a predetermined fixing method. This tissue slice or smear cells undergo various kinds of staining as necessary. The stains do not include only a general stain such as an HE (Hematoxylin-Eosin) stain, a Giemsa stain, or Papanicolaou stain, but also a fluorescent stain such as FISH (Fluorescence In-Situ Hybridization) or an enzyme labeled antibody method.

Further, a label where additional information (for example, the name of a person who is a sampler, the date of the sample collection, the kind of stain, and the like) for specifying a corresponding biological sample SPL is described may be attached to the preparation PRT.

The microscope 10 according to this embodiment is provided with a stage 130 on which the above-described preparation PRT is placed, and a stage driving mechanism 135 for moving the stage 130 in various directions. The stage 130 can be freely moved in directions (X axis direction and Y axis direction) parallel to the stage surface and in a direction perpendicular thereto (Z axis direction) by the stage driving mechanism 135.

The microscope 10 according to this embodiment may be provided with a sample transport device 141 which transports the preparation PRT including the sample SPL to the stage 130. The transport device 141 can automatically place a sample which is scheduled to be imaged on the stage 130 and automatically change the samples SPL.

Thumbnail Image Capturing Unit

The thumbnail image capturing unit 110 mainly includes, as shown in FIG. 2, a light source 111, an objective lens 112, and an imaging element 113.

The light source 111 is provided at an opposite side to the surface side of the stage 130 where the preparation is disposed. The light source 111 can change light (hereinafter, also referred to as bright field illumination light, or simply illumination light) applied to a biological sample SPL for which general staining is performed, and light (hereinafter, also referred to as a dark field illumination light) applied to a biological sample SPL for which special staining is performed, for illumination. In addition, the light source 111 may apply either the bright field illumination light or the dark field illumination light. In this case, as the light source 111, two light sources are provided, that is, a light source for applying the bright field illumination light and a light source for applying the dark field illumination light.

In the thumbnail image capturing unit 110, a label light source (not shown) which applies light used to image additional information described in the label attached to the preparation PRT, may be provided separately.

The objective lens 112 having a predetermined magnification has the normal line of the reference position of the thumbnail image capturing unit 110 in the surface where the preparation is disposed as the optical axis SRA, and is installed in the surface side of the stage 130 where the preparation is disposed. Light passing through the preparation PRT installed on the stage 130 is collected at the objective lens 112, and enables an image to be formed on the imaging element 113 provided in the rear side of the objective lens 112 (that is, the traveling direction of the illumination light).

The imaging element 113 forms thereon an image corresponding to light in an imaging range including the overall preparation PRT (in other words, light passing through the overall preparation PRT) placed on the surface of the stage 130 where the preparation is disposed. The image formed on the imaging element 113 is a thumbnail image which is a microscope image containing the overall preparation PRT.

Enlarged Image Capturing Unit

As shown in FIG. 2, the enlarged image capturing unit 120 mainly includes a light source 121, a condenser lens 122, an objective lens 123, and an imaging element 124.

The light source 121 applies the bright field illumination light, and is provided at an opposite side to the surface side of the stage 130 where the preparation is disposed. In addition, a light source (not shown) for applying the dark field illumination light is provided at a position (for example, the surface side where the preparation is disposed) different from the position of the light source 121.

The condenser lens 122 collects the bright field illumination light provided from the light source 121 or the dark field illumination light provided from a light source for dark field illumination light and guides the light to the preparation PRT on the stage 130. The condenser lens 122 has the normal line of the reference position of the enlarged image capturing unit 120 in the surface where the preparation is disposed as the optical axis ERA, and is installed between the light source 121 and the stage 130.

The objective lens 123 having a predetermined magnification has the normal line of the reference position of the enlarged image capturing unit 120 in the surface where the preparation is disposed as the optical axis ERA, and is installed in the surface side of the stage 130 where the preparation is disposed. The enlarged image capturing unit 120 can image the biological sample SPL through enlargement at various magnifications by appropriately exchanging the objective lenses 123. The light passing through the preparation PRT placed on the stage 130 is collected by the objective lens 123, and enables an image to be formed on the imaging element 124 which is provided on the rear side of the objective lens 123 (that is, the traveling direction of the illumination light).

An image in an imaging range including a predetermined longitudinal width and transverse width on the surface of the stage 130 where the preparation is disposed, is formed on the imaging element 124 depending on the pixel size of the imaging element 124 and the magnification of the objective lens 123. Further, since a part of the biological sample SPL is enlarged by the objective lens 123, the above-described imaging range is sufficiently narrower than the imaging range of the imaging element 113.

Here, as shown in FIG. 2, the thumbnail image capturing unit 110 and the enlarged image capturing unit 120 are disposed to be spaced apart from each other by the distance D in the Y axis direction in terms of the optical axis SRA and the optical axis ERA which are respectively the normal lines of the reference positions. The distance D is set to be small such that a microscope tube (not shown) which holds the objective lens 123 of the enlarged image capturing unit 120 is not included in the imaging range of the imaging element 113, and further for miniaturization.

The imaging element provided in each of the thumbnail image capturing unit 110 and the enlarged image capturing unit 120 may be a one-dimensional imaging element or a two-dimensional imaging element.

Overall Configuration of Microscope Control Device

The microscope 10 according to this embodiment is connected to the microscope control device 20 for controlling various parts of the microscope as shown in FIG. 2. The microscope control device 20 mainly includes, as shown in FIG. 2, an overall control unit 201, an illumination control unit 203, a stage driving control unit 205, a thumbnail image capturing control unit 207, an enlarged image capturing control unit 209, and a storage unit 211.

Here, the illumination control unit 203 is a processing unit which controls various kinds of light sources including the light source 111 and the light source 121 provided in the microscope 10, and the stage driving control unit 205 is a processing unit which controls the stage driving mechanism 135. In addition, the thumbnail image capturing control unit 207 is a processing unit which controls the imaging element 113 for capturing a thumbnail image, and the enlarged image capturing control unit 209 is a processing unit which controls the imaging element 124 for capturing an enlarged image of the biological sample SPL. These control units are connected to the parts which are controlled via various kinds of data communication paths.

In the microscope control device 20 according to this embodiment, the control unit (the overall control unit 201) which controls the overall microscope is provided separately, and is connected to the above-described control units via various kinds of data communication paths.

The control units are implemented by a CPU (Central Processing Unit), a ROM (Read-Only Memory), a RAM (Random Access Memory), a storage device, a communication device, an arithmetic circuit, and the like.

The storage unit 211 is an example of a storage device provided in the microscope control device 20 according to this embodiment. The storage unit 211 stores various kinds of setting information for controlling the microscope 10 according to this embodiment, various kinds of databases, a lookup table such as a load prediction table, or the like. Further, the storage unit 211 may store various kinds of history information such as imaging history of samples in the microscope 10. In addition, the storage unit 211 records various parameters which are necessary to be reserved when the microscope control device 20 according to this embodiment performs a certain process, or a mid-flow progress of the process, or various kinds of databases or programs.

Each processing unit provided in the microscope control device 20 can freely perform reading from and writing in the storage unit 211.

Hereinafter, functions of the above-described control units excluding the overall control unit 201 will be described briefly. The overall control unit 201 will be described below again in detail.

Illumination Control Unit

The illumination control unit 203 is a processing unit which controls various light sources provided in the microscope 10 according to this embodiment. When information indicating an illumination method of the biological sample SPL is output from the overall control unit 201, the illumination control unit 203 controls illumination of a corresponding light source based on the obtained information indicating the illumination method.

For example, attention to a case where the illumination control unit 203 controls the light source 111 included in the thumbnail image capturing unit 110 is paid. In this case, the illumination control unit 203 determines whether to perform either a mode for obtaining a bright field image (hereinafter, referred to as a "bright field mode") or a mode for obtaining a dark field image (hereinafter, referred to as a "dark field mode") by referring to the information indicating the illumination method. Thereafter, the illumination control unit 203 sets parameters according to each mode in the light source 111, and enables the light source 111 to apply illumination light suitable for each mode. Thereby, the illumination light provided from the light source 111 is applied to the overall biological sample SPL via an aperture of the stage 130. In addition, as the parameters set by the illumination control unit 203, for example, the intensity of the illumination light or the kind of light source may be selected.

In addition, attention to a case where the illumination control unit 203 controls the light source 121 included in the enlarged image capturing unit 120 is paid. In this case, the illumination control unit 203 determines whether to perform either the bright field mode or the dark field mode by referring to the information indicating the illumination method. Thereafter, the illumination control unit 203 sets parameters according to each mode in the light source 121, and enables the light source 121 to apply illumination light suitable for each mode. Thereby, the illumination light provided from the light source 121 is applied to the overall biological sample SPL via the aperture of the stage 130. In addition, as the parameters set by the illumination control unit 203, for example, the intensity of the illumination light or the kind of light source may be selected.

The illumination light in the bright field mode is preferably visible light. In addition, the illumination light in the dark field mode is preferably light including a wavelength which can excite a fluorescent marker used for the special staining. In the dark field mode, a background part of the fluorescent marker is cut out.

Stage Driving Control Unit

The stage driving control unit 205 is a processing unit which controls the stage driving mechanism 135 for driving the stage provided in the microscope 10 according to this embodiment. When information indicating an imaging method of the biological sample SPL is output from the overall control unit 201, the stage driving control unit 205 controls the stage driving mechanism 135 based on the obtained information indicating the imaging method.

For example, attention to a case where the microscope 10 according to this embodiment captures a thumbnail image is paid. When information indicating that a thumbnail image of the biological sample SPL is captured is output from the overall control unit 201, the stage driving control unit 205 moves the stage 130 in the stage surface direction (X-Y axis direction) such that the overall preparation PRT is included in the imaging range of the imaging element 113. Further, the stage driving control unit 205 moves the stage 130 in the Z axis direction such that the objective lens 112 focuses on the overall preparation PRT.

In addition, attention to a case where the microscope 10 according to this embodiment captures an enlarged image is paid. When information indicating that an enlarged image of the biological sample SPL is captured is output from the overall control unit 201, the stage driving control unit 205 controls driving of the stage driving mechanism 135 and moves the stage 130 in the stage surface direction such that the biological sample SPL is located from between the light source 111 and the objective lens 112 to between the condenser lens 122 and the objective lens 123.

The stage driving control unit 205 moves the stage 130 in the stage surface direction (the X-Y axis direction) such that a predetermined site of the biological sample is located in the imaging range of the imaging element 124.

In addition, the stage driving control unit 205 controls driving of the stage driving mechanism 135, and moves the stage 130 in the direction perpendicular to the stage surface (Z axis direction, a depth direction of the tissue slice) such that the objective lens 123 focuses on the site of the biological sample SPL located in the predetermined imaging range.

Thumbnail Image Capturing Control Unit

The thumbnail image capturing control unit 207 is a processing unit which controls the imaging element 113 provided in the thumbnail image capturing unit 110. The thumbnail image capturing control unit 207 sets parameters according to the bright field mode or the dark field mode in the imaging element 113. In addition, when obtaining an output signal which is output from the imaging element 113 and corresponds to an image formed on the image forming surface of the imaging element 113, the thumbnail image capturing control unit 207 recognizes the obtained output signal as an output signal corresponding to a thumbnail image. The thumbnail image capturing control unit 207 obtains the output signal corresponding to the thumbnail image and outputs data (raw data) corresponding to the obtained signal to the overall control unit 201. Examples of the parameters set by the thumbnail image capturing control unit 207 include the starting timing and finishing timing of exposure, and the like.

Enlarged Image Capturing Control Unit

The enlarged image capturing control unit 209 is a processing unit which controls the imaging element 124 provided in the enlarged image capturing unit 120. The enlarged image capturing control unit 209 sets parameters according to the bright field mode or the dark field mode in the imaging element 124. In addition, when obtaining an output signal which is output from the imaging element 124 and corresponds to an image formed on the image forming surface of the imaging element 124, the enlarged image capturing control unit 209 recognizes the obtained output signal as an output signal corresponding to an enlarged image. The enlarged image capturing control unit 209 obtains the output signal corresponding to the enlarged image and outputs data (raw data) corresponding to the obtained signal to the overall control unit 201. Examples of the parameters set by the enlarged image capturing control unit 209 include the starting timing and finishing timing of exposure, and the like.

Configuration of Overall Control Unit

Figure 3:
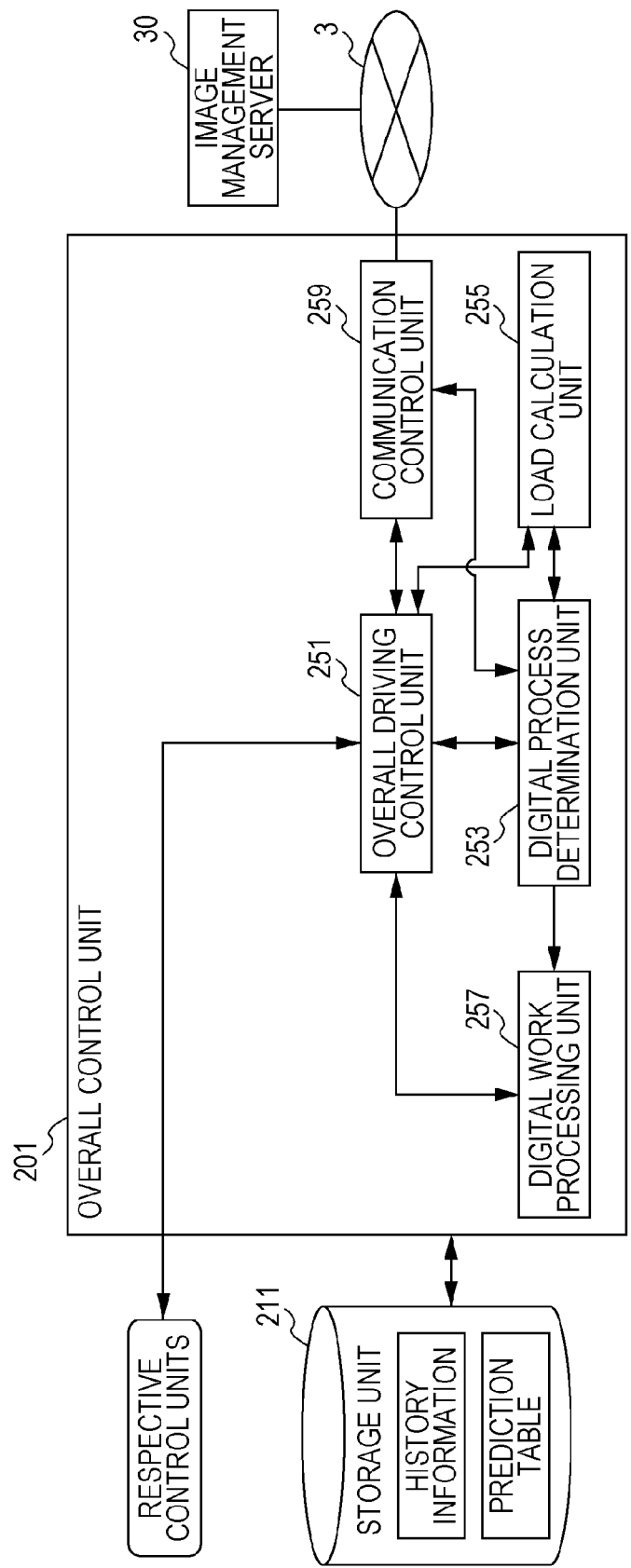
FIG. 3 is a block diagram illustrating an overall control unit included in the microscope control device according to the same embodiment.

The overall control unit 201 is a processing unit which controls the overall microscope including the above-described control units. Hereinafter, with reference to FIG. 3, a configuration of the overall control unit 201 provided in the microscope control device 20 according to this embodiment will be described in detail. FIG. 3 is a block diagram illustrating a configuration of the overall control unit 201 according to this embodiment.

The overall control unit 201 according to this embodiment mainly includes, as shown in FIG. 3, an overall driving control unit 251, a digital work determination unit 253, a load calculation unit 255, a digital work processing unit 257, and a communication control unit 259.

The overall driving control unit 251 is implemented by, for example, a CPU, a ROM, a RAM, and the like. The overall driving control unit 251 is a driving control unit which collectively controls the control units (the illumination control unit 203, the stage driving control unit 205, the thumbnail image capturing control unit 207, and the enlarged image capturing control unit 209) controlling the respective parts of the microscope 10 according to this embodiment. The overall driving control unit 251 sets various kinds of information (for example, various kinds of setting parameters) in the respective parts of the microscope 10 or obtains various kinds of information from the respective parts of the microscope 10. In addition, the overall driving control unit 251 obtains data corresponding to a thumbnail image (hereinafter, referred to as "thumbnail image data"), output from the thumbnail image capturing control unit 207, or data corresponding to an enlarged image (hereinafter, referred to as "enlarged image data"), output from the enlarged image capturing control unit 209.

When controlling driving of the respective parts of the microscope 10, the overall driving control unit 251 can refer to various kinds of databases or history information stored in the storage unit 211. In addition, the overall driving control unit 251 may temporarily store obtained thumbnail image data or enlarged image data in the storage unit 211.

When obtaining thumbnail image data or enlarged image data from the microscope 10, the overall driving control unit 251 performs various kinds of processes for the image data along with the digital work determination unit 253, the load calculation unit 255, the digital work processing unit 257, and the like, described below.

The overall driving control unit 251 uploads digital image data for an imaged sample (thumbnail image data or enlarged image data) or various kinds of metadata related thereto, to the image management server 30 via the communication control unit 259 described later.

When uploading enlarged image data to the image management server 30, the overall driving control unit 251 correlates the enlarged image data with identification information indicating whether or not a predetermined digital work process has been performed therefor as described later.

The digital work determination unit 253 is implemented by, for example, a CPU, a ROM, a RAM, and the like. The digital work determination unit 253 determines whether or not a predetermined digital work process is to be performed by the digital work processing unit 257 described later based on a load value calculated by the load calculation unit 255 described later and a load value for the server obtained from the image management server 30.

More specifically, in a case where the overall driving control unit 251 starts a control for capturing an enlarged image, the digital work determination unit 253 obtains an imaging condition from the overall driving control unit 251 and outputs the obtained imaging condition to the load calculation unit 255. In addition, along with the output of the obtained imaging condition, the digital work determination unit 253 requests the load calculation unit 255 to calculate a load value which is necessary to capture the enlarged image (more specifically, a load value which is necessary to control the capturing process of an enlarged image).

In addition, the digital work determination unit 253 inquires of the image management server 30 a load value for the corresponding server via the overall driving control unit 251 and the communication control unit 259.

Thereafter, the digital work determination unit 253 compares the load value for the microscope control device 20, obtained from the load calculation unit 255 with the load value for the server, obtained from the image management server 30, and determines whether or not the microscope control device 20 performs a digital work process.

More specifically, the digital work determination unit 253 requests the digital work processing unit 257 to perform a predetermined digital work process if the load value calculated by the load calculation unit 255 is lower than the load value for the server. In addition, the digital work determination unit 253 determines that a predetermined digital work process is to be performed by the image management server 30 if the load value calculated by the load calculation unit 255 is higher than the load value for the server.

When the determination result of the digital work process is fixed, the digital work determination unit 253 outputs the obtained determination result to the overall driving control unit 251. The overall driving control unit 251 correlates identification information indicating whether or not the digital work process has been performed, with the enlarged image data to be uploaded to the image management server 30, depending on the determination result output from the digital work determination unit 253. In addition, if the digital work process is to be performed by the microscope control device 20, the digital work determination unit 253 requests the digital work processing unit 257 to perform the digital work process.

The load calculation unit 255 is implemented by, for example, a CPU, a ROM, a RAM, and the like. The load calculation unit 255 is a processing unit which calculates a load necessary to capture an enlarged image (more specifically, to control the capturing of an enlarged image).

When the load calculation unit 255 receives the request for calculation of a load value from the digital work determination unit 253, it obtains imaging conditions for an enlarged image from the overall driving control unit 251. Examples of the imaging conditions for the enlarged image include exposure time, amount of light, imaged region, control or no control of automatic focus, and the like. In addition, the imaging conditions may include the kind of imaging mode (for example, a bright field imaging mode, a dark field imaging mode, or the like).

During the exposure for imaging a sample, there are many cases where the microscope control device 20 is in a low load state. In addition, in a case of capturing a fluorescent image of a sample (that is, the sample is imaged under the dark field illumination), the exposure time is longer than the case of imaging a sample under the general bright field illumination. Therefore, when the exposure time is relatively long, the load of the microscope control device 20 may be low.

In a case where the light amount is large, the exposure time for obtaining an output signal from an imaging element having a good S/N ratio may be relatively short. For this reason, in a case where the light amount is relatively large, the load of the microscope control device 20 may be high.

Further, in a case where the imaged region is relatively large, the load of the microscope control device 20 may be high because more regions are imaged. The area of the imaged region can be specified from the size of a thumbnail image which is captured before an enlarged image.

In a case where the automatic focus for the microscope is performed, the microscope control device 20 controls the optical system of the microscope 10 such that a sample is in a focused focal point. Therefore, in this case, the load of the microscope control device 20 may be high.

Based on these findings, the load calculation unit 255 calculates a load necessary to control the capturing of an enlarged image using the imaging conditions for the enlarged image.

Here, a method for calculating a load value for the microscope control device 20 is not particularly limited, but may use arbitrary methods. For example, the load calculation unit 255 may calculate the load value from the imaging conditions by referring to history information (history information which correlates imaging conditions with actual load values in the corresponding imaging conditions) stored in the storage unit 211. After a correlation function between the imaging conditions and the load values is determined in advance, the load calculation unit 255 may calculate a load value using the correlation function.

Figure 5:
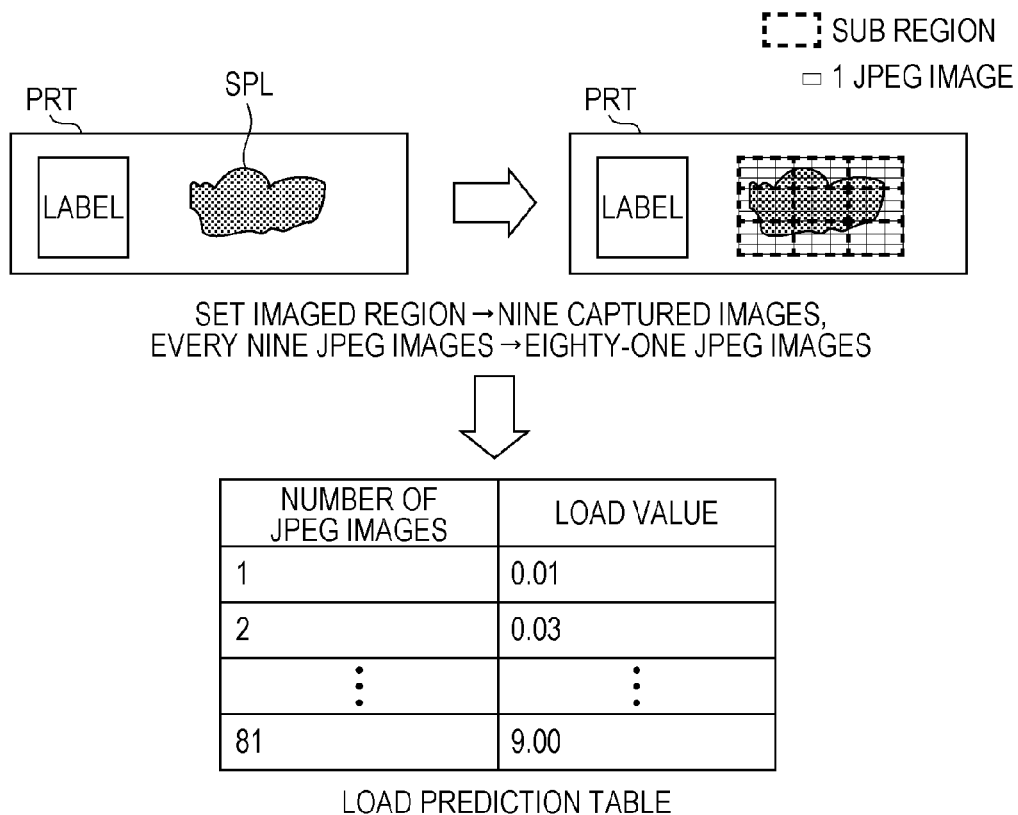
FIG. 5 is a diagram illustrating an example of a prediction method of a load value according to the same embodiment.
Figure 6:
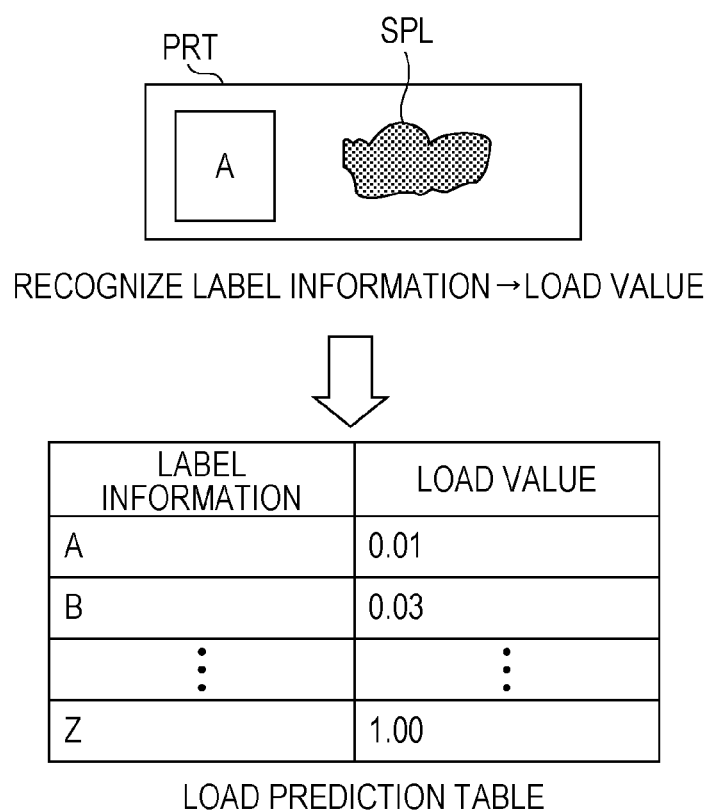
FIG. 6 is a diagram illustrating an example of a prediction method of a load value according to the same embodiment.

In addition, the load calculation unit 255 may predict a load value according to capturing of an enlarged image using a load prediction table stored in the storage unit 211. Hereinafter, a prediction method of a load value using the load prediction table will be described briefly with reference to FIGS. 4 to 6. FIGS. 4 to 6 are diagrams illustrating examples of the prediction method of a load value according to this embodiment.

The microscope 10 according to this embodiment generates a thumbnail image obtained by the thumbnail image capturing unit 110 imaging the overall preparation including a certain sample and an enlarged image obtained by the enlarged image capturing unit 120 imaging the sample in detail. The overall driving control unit 251 detects a position of the sample (subject) in the preparation by referring to the thumbnail image of the sample, and determines the region where the sample is located in the preparation as a region for capturing the enlarged image. The overall driving control unit 251 divides the region for capturing the enlarged image into a plurality of sub-regions based on the magnification of the microscope 10, and images the respective sub-regions. Thereby, the enlarged image regarding one sample includes images obtained by imaging the plurality of sub-regions (hereinafter, referred to as "sub-region images").

FIG. 4 shows an example of predicting a load value for the microscope control device 20 by using the number of sub-region images forming an enlarged image regarding a certain sample and the load prediction table stored in the storage unit 211. In the load prediction table, as shown in FIG. 4, the number of sub-region images to be captured is correlated with a load value corresponding to the number of images to be captured. Therefore, the load calculation unit 255 obtains the number of sub-region images from the overall driving control unit 251 as the imaging condition, and predicts a load value based on the obtained number of sub-region images.

FIG. 4 shows an example where the sample SPL existing in the preparation PRT with a label is divided into nine sub-regions. In this case, the load calculation unit 255 predicts a load value as 1.00 by referring to the load prediction table based on the number of sub-region images.

In addition, the overall driving control unit 251 forms one sub-region image as a plurality of tile images. Therefore, an enlarged image regarding a certain sample includes a plurality of sub-region images, and each sub-region image includes a plurality of tile images. Therefore, the load calculation unit 255 may predict a load value for the microscope control device 20 based on not the number of sub-region images forming the enlarged image but the number of tile images forming the enlarged image.

FIG. 5 shows an example of predicting a load value for the microscope control device 20 using the number of tile images forming enlarged images regarding a certain sample and the load prediction table stored in the storage unit 211. In the load prediction table, as shown in FIG. 5, the number of tile images to be captured is correlated with a load value corresponding to the number of images to be captured. Therefore, the load calculation unit 255 obtains the number of tile images from the overall driving control unit 251 as the imaging condition, and predicts a load value depending on the obtained number of tile images.

FIG. 5 shows an example where the sample SPL existing in the preparation PRT with a label is divided into nine sub-regions, and each sub-region is divided into nine tile images (JPEG images). As a result, in the example shown in FIG. 5, one enlarged image is formed by eighty-one tile images. In this case, the load calculation unit 255 predicts a load value as 9.00 by referring to the load prediction table based on the number of tile images.

There are many cases where a label regarding an attribute of a sample (a source which has provided the sample or the name of the sample) or an imaging method of a sample is described using a character string or a barcode in the preparation PRT including the sample SPL. Therefore, a load value for the microscope control device 20 may be predicted using various kinds of information listed in the label (hereinafter, referred to as "label information"), and a load prediction table, corresponding to the label information, which is prepared in advance. Here, the label information used to predict a load value includes an imaging method of a slide (for example, a dark field imaging mode, a bright field imaging mode, or the like) and the like.

FIG. 6 shows a case of predicting a load value using such label information. When a thumbnail image is captured, the overall driving control unit 251 reads the label information according to the capturing of a thumbnail image and recognizes content which is described as the label information. The load calculation unit 255 obtains a recognition result of the label information from the overall driving control unit 251, and predicts a load value from the load prediction table based on the obtained recognition result of the label information. In the example shown in FIG. 6, the load calculation unit 255 obtains information "A" described as the label information from the overall driving control unit 251, and predicts a load value of 0.01 from the load prediction table.

The load calculation unit 255 predicts a load value for the microscope control device 20 using the load prediction methods as described above. In addition, the cases shown in FIGS. 4 to 6 are only examples, and the load prediction methods used by the load calculation unit 255 are not limited to the above-described cases.

In addition, the load calculation unit 255 may predict a load value for the microscope control device 20 using one of the above-described load prediction methods or may predict a load value for the microscope control device 20 using a plurality of load prediction methods together. Therefore, the storage unit 211 may store a single load prediction table or may store a plurality of load prediction tables.

In a case of predicting a load value using a plurality of load prediction methods together, an adding process (for example, a calculation process of an average value) for load values obtained by the respective load prediction methods may be performed. Further, the largest load value (that is, a value indicating the highest load) of the load values obtained by a plurality of load prediction methods may be a load value for the microscope control device 20.

The load calculation unit 255 calculates a load value for the microscope control device 20 by performing at least one of the load value calculation process and the load value prediction process as described above.

Here, in a case where both the load value calculation process and the load value prediction process are performed, which load value the load calculation unit 255 uses may be appropriately determined by a user's operation or the like. The load calculation unit 255 may use an average value of a calculated load value and a predicted load value as a load value for the microscope control device 20, or may use the largest load value (that is, a value indicating the highest load) as a load value for the microscope control device 20.

Here, a load value for the microscope control device 20 may be represented as a load average for the microscope control device 20, or may be represented as a disk working time in a case of using various kinds of disk devices as a storage device. Further, a load value for the microscope control device 20 may be represented as an idle time at a certain processing unit. In addition, values for representing a load value are not limited thereto, but a load value for the microscope control device 20 may be represented using values other than these.

As described above, in order to compare a load value for the microscope control device 20 with a load value for the image management server 30, the microscope control device 20 and the image management server 30 are preferably agreed on which value represents a load value.

When determining a value used as a load value for the microscope control device 20, the load calculation unit 255 outputs the value to the digital work determination unit 253.

In addition, the load value calculation process in the load calculation unit 255 may be performed periodically before imaging, or may be performed periodically at a predetermined cycle.

The digital work processing unit 257 is implemented by, for example, a CPU, a GPU, a ROM, a RAM, and the like. When the overall driving control unit 251 obtains thumbnail image data or enlarged image data (more specifically, raw data for the images), the digital work processing unit 257 performs a development process for the raw data and connects a plurality of images forming the images to each other (a stitching process).

In addition, when a request for a predetermined digital work process is made by the digital work determination unit 253, the digital work processing unit 257 performs the predetermined digital work process for image data which has undergone the development process or the stitching process.

Here, a predetermined digital work process performed by the digital work processing unit 257 may include a conversion process of digital image data (transcode), an arrangement changing process of digital images, or the like.

The conversion process of digital images may include a process for generating JPEG images or the like through compression of digital images, a process for converting data compressed to JPEG images or the like into compressed images having different formats (for example, a GIF format and the like). In addition, the conversion process of digital images includes a process where a second compression is performed after compressed image data is once decompressed and then undergoes a process such as an edge emphasis, a process for changing compression ratios of compressed images, and the like. These digital work processes are preferably performed by, for example, a graphic board or the like including the GPU, the ROM, the RAM, and the like which are installed in the microscope control device 20, in order to suppress the load of the microscope control device 20.

Figure 7A:
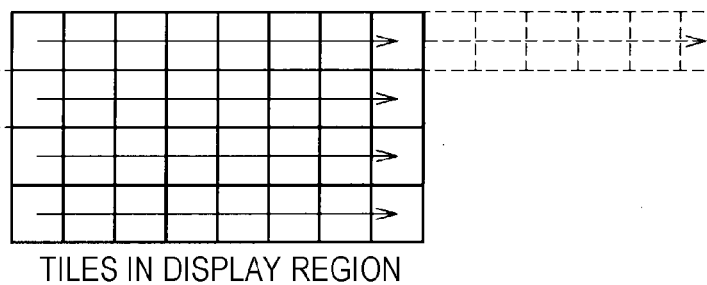
FIG. 7A and 7B are diagrams illustrating the order of tile images to be stored.
Figure 7B:
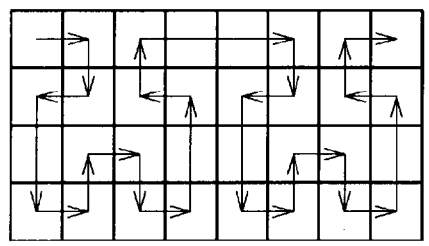

Next, with reference to FIGS. 7A and 7B, the arrangement changing process of digital images will be described briefly. FIGS. 7A and 7B are diagrams illustrating examples (the arrangement changing process of digital image) of the digital work process according to this embodiment.

As described above, one sample includes a plurality of tile images. If an inspector intends to inspect an image corresponding to a certain site of a sample image, the inspector of a digital image of a sample obtains data for tile images corresponding to the site which is wanted to be inspected and makes the data displayed on a display screen of the image display device 40 which is a terminal. In addition, if the inspector of the digital image intends to change sites which are wanted to be inspected, the inspector changes states of the display screen by changing the tile images which are currently inspected to tile images corresponding to a site after the change. Therefore, in order to perform the display change in the image display device 40 at high speed, it is preferable that a time necessary to change a tile image to another tile image is substantially uniform for the respective tile images forming the sample image.

Therefore, the digital work processing unit 257 changes the order of tile images to be stored such that a plurality of digital images (tile images) is positioned substantially at the same distance between each other in a storage region of the image management server 30.

Specifically, the digital work processing unit 257 performs the Hilbert transform for each tile image and changes the order of tile images to be stored in the storage region according to a result of the Hilbert transform (more specifically, in order of the Hilbert curve).

Figure 9:
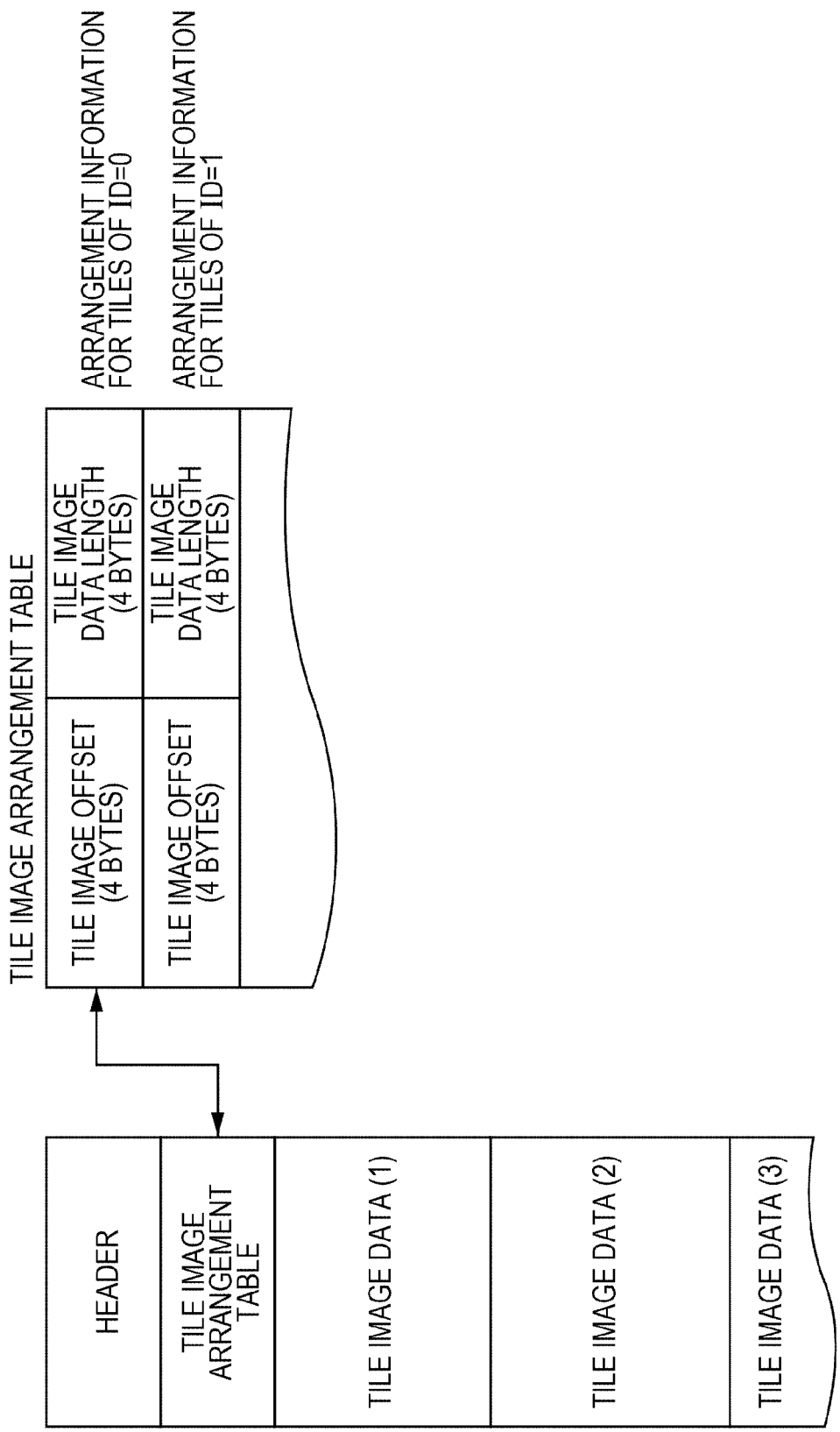
FIG. 9 is a diagram illustrating an example of a data structure of microscope image data according to the same embodiment.
Figure 10:
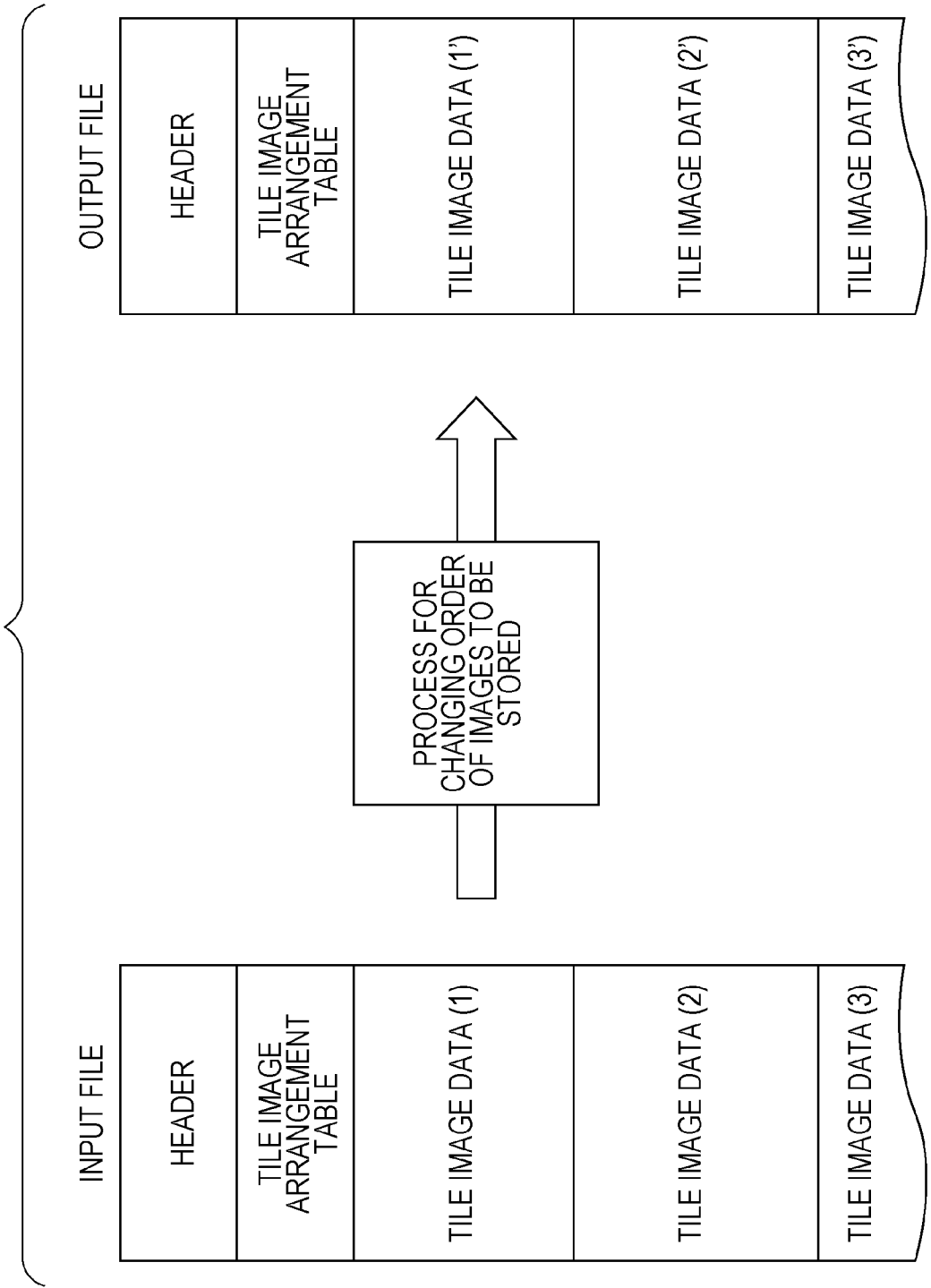
FIG. 10 is a diagram illustrating an example of a data structure of microscope image data according to the same embodiment.

Hereinafter, a process for changing the order of tile images to be stored (an arrangement changing process) will be described in detail with reference to FIGS. 7A to 10. FIGS. 7A and 7B are diagrams illustrating the order of tile images to be stored. FIG. 8 is a diagram illustrating tile images according to this embodiment. FIGS. 9 and 10 are diagrams illustrating examples of a data structure of microscope image data according to this embodiment.

As described above, a microscope image regarding a certain sample includes a plurality of tile images. The microscope image management system 1 according to this embodiment manages the plurality of tile images as a microscope image of the sample in one lump. When such a microscope image is inspected, the display screen is formed by obtaining tile images used to be displayed among the plurality of tile images managed in one lump.

As shown in FIG. 7A, it is assumed that a plurality of tile images forming the microscope image is stored sequentially in the column direction from the top left corner to the bottom right corner, and thirty-two tile images existing substantially in the central part of the microscope image are to be obtained. In this case, it is necessary to inspect by skipping storage regions corresponding to the tile images which are not used to be displayed after eight tile images positioned at the uppermost row are obtained until a tile image positioned at the left end in the second row from above is obtained. In this way, in the case where the tile images corresponding to the display region are arranged to be apart from each other, a seek time for obtaining the tile images to be used is increased.

The problem of the increase in the seek time also occurs in a case where the tile images are stored sequentially in the row direction as well as the case where the tile images are stored sequentially in the column direction as shown in FIG. 7A.

Therefore, the digital work processing unit 257 according to this embodiment calculates a Hilbert curve which is one of the space-filling curves covering a region which includes a plurality of tile images forming the microscope image. A calculation method of the Hilbert curve used by the digital work processing unit 257 is not particularly limited, but may use any well-known algorithm (calculation method). Due to the calculation of the Hilbert curve, the plurality of tile images forming the microscope image is positioned at any point of the Hilbert curve. Therefore, the digital work processing unit 257 stores the plurality of tile images forming the microscope image in an appearing order on the Hilbert curve.

The tile images are stored in order of the Hilbert curve, and thereby, as shown in FIG. 7B, tile image groups positioned to be close to each other on the plane are also positioned to be close to each other in appearing order on the Hilbert curve. Therefore, as shown in FIG. 7B, even in the case where the tile images positioned substantially at the central part of the microscope image are obtained, it is possible to reduce the seek time for obtaining the tile images.

In order to store the tile images in order of the Hilbert curve, it is preferable to clarify the correlation between a position of the tile image on the microscope image (a position of the tile image in the plane) and the storing order. Thus, the digital work processing unit 257 according to this embodiment allocates identification information unique to each tile image (hereinafter, also referred to as a tile ID) to the plurality of tile images forming the microscope image as shown in FIG. 8. The allocation of the tile ID may use any method as long as a tile ID corresponds to a position of a tile image in the microscope image one to one. The digital work processing unit 257 allocates the tile ID, for example, such that a tile ID of a corresponding tile image can be calculated from coordinates (m, n) for a tile position in the microscope image.

In the example shown in FIG. 8, the digital work processing unit 257 allocates a tile ID of the tile image positioned at the top left corner of the microscope image to 0, and allocates the tile ID to each tile image such that the tile ID increases by one in the right direction. At this time, if the number of tile images of the microscope image existing in the transverse direction is W, and the coordinates for the top left corner of the microscope image are the origin (0, 0), a tile ID of a tile image existing at a position indicated by (m, n) has a value calculated using the following Equation 101.

$$\text{Tile } ID = n \times W + m \qquad \text{(Equation 101)}$$

Further, the digital work processing unit 257, for example, as shown in FIG. 9, additionally records a table (a tile image arrangement table) indicating the arrangement of the tile images in a portion (for example, between the header and each of tile image data) of the data structure of the microscope image data. As shown in FIG. 9, the offset from the beginning of the tile image file and the image data length (for example, a compressed data length) corresponding to one tile are described sequentially from the tile ID=0 in the tile image arrangement table. Although the regions for describing the tile image offset and the tile image data length may be appropriately set, they may be set to, for example, 4 bytes, respectively.

First, the digital work processing unit 257 calculates the Hilbert curve for an obtained microscope image and allocates a tile ID to a plurality of tile images forming the corresponding microscope image. Further, as shown in the left part of FIG. 10, the digital work processing unit 257 temporarily stores, in a predetermined storage region, data for all the tile images forming the microscope image in ascending order from the tile ID=0 (input file).

Thereafter, the digital work processing unit 257 changes the order of the tile images to be stored by performing a process for changing the order of the tile images to be stored using the Hilbert curve. Thereby, the microscope image data including tile images is stored so as to be positioned substantially at the same distance between each other in the storage region.

FIG. 11A shows a case where one slide (sample) is imaged and is compressed to nine tile images. In FIG. 11A, for convenience of description, the sample image is compressed to the tile images (JPEG images) sequentially from the top left part of the slide. Here, the number given to each tile image indicates a unit which can be decoded as one JPEG image. The nine JPEG images (tile images) are stored in one lump and are thus treated as a set of data corresponding to one slide.

The digital work processing unit 257 temporarily stores the tile images in a storage region (for example, the storage unit 211) of the microscope control device 20 in numbering order. In addition, as shown in FIG. 11B, the digital work processing unit 257 performs the Hilbert transform for the stored JPEG images and changes the arrangement in order of the Hilbert curve such that the respective pieces of tile image data are positioned almost at the same distance between each other in the storage region. The digital work processing unit 257 outputs the set of tile image data of which the arrangement is changed in this way to the overall driving control unit 251. The overall driving control unit 251 uploads the set of tile image data of which the arrangement is changed to the image management server 30 via the communication control unit 259.

The communication control unit 259 is implemented by, for example, a CPU, a ROM, a RAM, a communication device, and the like. The communication control unit 259 controls communication between the microscope control device 20 and a device outside the microscope control device 20, performed via the network 3.

Above, an example of the function of the microscope control device 20 according to this embodiment has been described. Each of the above-described constituent elements may be constituted using general members or circuits, or may be constituted by hardware specific to the function of each constituent element. All the functions of the respective constituent elements may be performed by the CPU or the like. Therefore, a configuration to be used may be appropriately modified according to the technical level at the time when this embodiment is practiced.

In addition, a computer program for realizing the respective functions of the microscope control device 20 according to this embodiment as described above may be created and installed in a personal computer or the like. Further, it is possible to provide a recording medium which stores the computer program therein and is readable by a computer. The recording medium includes, for example, a magnetic disk, an optical disc, a magneto-optical disc, a flash memory, and the like. The computer program may be delivered via, for example, a network, without using the recording medium.

Format of Data to be Uploaded

Next, a format of data for a microscope image uploaded from the microscope control device 20 to the image management server 30 will be described briefly with reference to FIG. 12. FIG. 12 is a diagram illustrating an example of a data structure of the microscope image data.

A format of data uploaded from the microscope control device 20 to the image management server 30 has a structure as shown in FIG. 12. The number string shown in FIG. 12 indicates a bit stream. The microscope image data includes a header and data body as shown in FIG. 12. In addition, the leading 1 bit of the header describes identification information indicating whether or not the predetermined digital work process as described above has been performed. In other words, when data "0" is described in the leading 1 bit of the header, it indicates that the predetermined digital work process has not been performed for the microscope image data. In addition, when data "1"is described in the leading 1 bit of the header, it indicates that the predetermined digital work process has been performed for the microscope image data.

By the use of the microscope image data employing such a data format, the image management server 30 which is a destination of data to be uploaded can easily determine whether or not the predetermined digital work process has been performed for the microscope image data.

Configuration of Image Management Server

Figure 13:
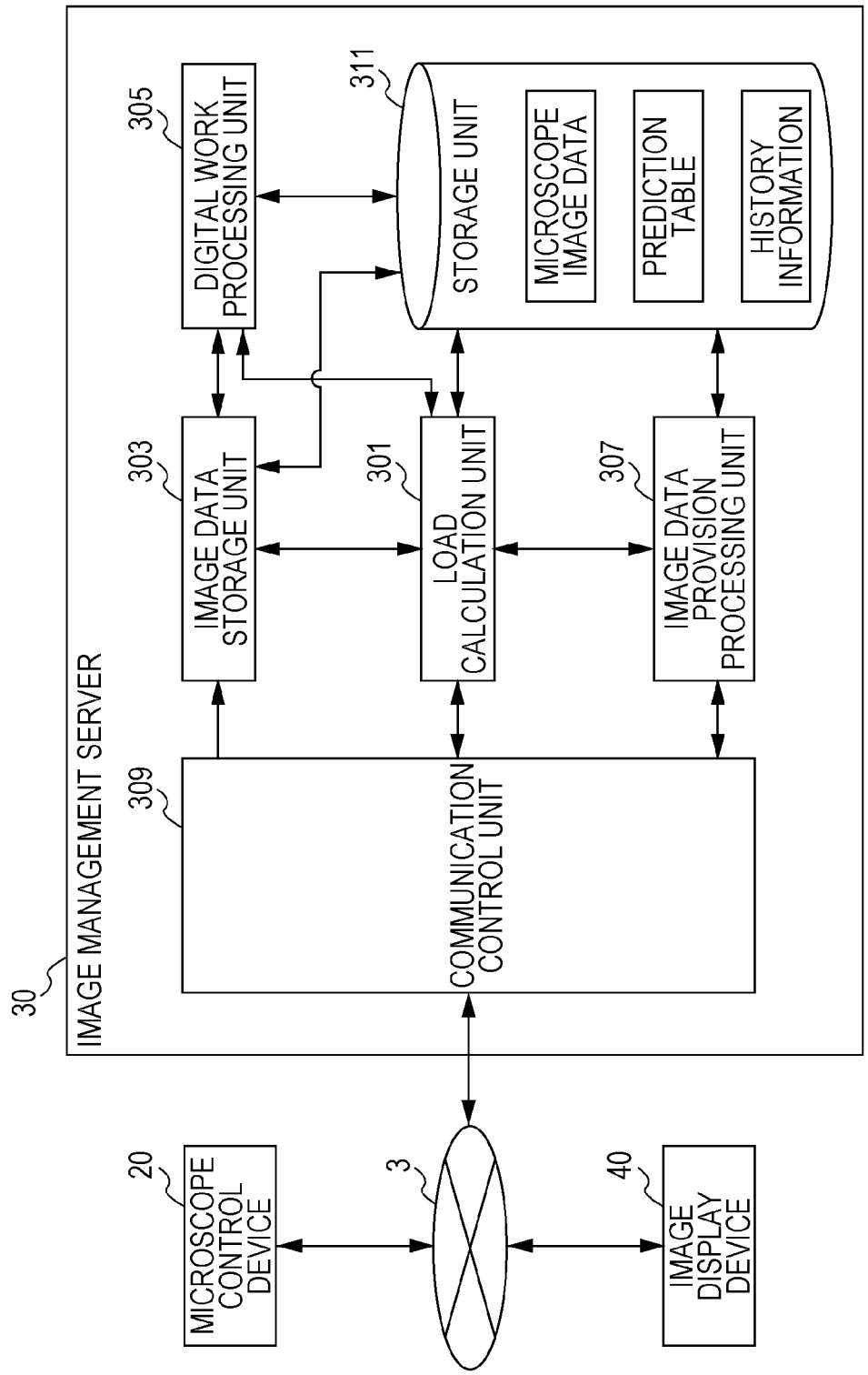
FIG. 13 is a block diagram illustrating an image management server according to the same embodiment.

Next, with reference to FIG. 13, a configuration of the image management server 30 according to this embodiment will be described in detail. FIG. 13 is a block diagram illustrating a configuration of the image management server 30 according to this embodiment.

The image management server 30 according to this embodiment mainly includes, for example, as shown in FIG. 13, a load calculation unit 301, an image data storage processing unit 303, a digital work processing unit 305, an image data provision processing unit 307, a communication control unit 309, and a storage unit 311.

The load calculation unit 301 is implemented by, for example, a CPU, a ROM, a RAM, and the like. The load calculation unit 301 calculates the sum of loads which are necessary for a data storage process for storing enlarged image data, a data provision process for providing the stored enlarged image data to the image display device 40, and a predetermined digital work process, and outputs the calculated sum of the loads to the microscope control device 20.

More specifically, when the communication control unit 309 described later receives an inquiry about a load state of the image management server 30 from the microscope control device 20, the corresponding inquiry is transmitted to the load calculation unit 301. When the load calculation unit 301 receives the inquiry about the load state from the microscope control device 20, it inquires load states of the image data storage processing unit 303, the digital work processing unit 305, and the image data provision processing unit 307, described later.

The image data storage processing unit 303, the digital work processing unit 305, and the image data provision processing unit 307, which have received the inquiry, obtain load values by calculating load values based on a condition according to each process, predicting load values using the load prediction table or the like, through the above-described methods, and output the obtained load values to the load calculation unit 301.

The load calculation unit 301 calculates a load value for the image management server 30 based on the load values obtained from the image data storage processing unit 303, the digital work processing unit 305, and the image data provision processing unit 307. The calculation method of a load value for the overall image management server 30 is not particularly limited, but, for example, the sum of load values obtained by the respective processing units may be used as a load value for the overall image management server 30.

When the load calculation unit 301 calculates a load value for the overall image management server 30, it outputs the calculated load value to the microscope control device 20 via the communication control unit 309.

The image data storage processing unit 303 is implemented by, for example, a CPU, a ROM, a RAM, and the like. The image data storage processing unit 303 obtains the microscope image data transmitted from the microscope control device 20 via the communication control unit 309, and stores the obtained data in a predetermined storage region of the storage unit 311 described later. At this time, the image data storage processing unit 303 checks the header of the enlarged image data of the microscope image data obtained from the microscope control device 20, and determines whether or not a predetermined digital work process has been performed. As a result of checking the header of the enlarged image data, if the predetermined digital work process has not been performed, the image data storage processing unit 303 requests the digital work processing unit 305 described later to perform the predetermined digital work process.

The digital work processing unit 305 is implemented by, for example, a CPU, a GPU, a ROM, a RAM, and the like. When the enlarged image data obtained from the microscope control device 20 has not undergone the predetermined digital work process, the digital work processing unit 305 performs the predetermined digital work process for the enlarged image data. The predetermined digital work process performed by the digital work processing unit 305 may include a conversion process of digital image data (transcode), an arrangement changing process of digital image, and the like.

The predetermined digital work process is the same as the digital work process performed by the digital work processing unit 257 of the microscope control device 20 according to this embodiment, and thus the detailed description thereof will be omitted.

If the predetermined digital work process is completed, the digital work processing unit 305 outputs the enlarged image data having undergone the digital work process to the image data storage processing unit 303.

The image data provision processing unit 307 is implemented by, for example, a CPU, a ROM, a RAM, and the like. The image data provision processing unit 307 provides the microscope image data (the thumbnail image data and the enlarged image data) stored in a predetermined storage region to the image display device 40 in response to a request from the image display device 40.

The image data provision processing unit 307 provides, for example, a list of the microscope image data stored in the image management server 30 to the image display device 40. When a user refers to the display screen of the image display device 40 which displays the list and selects microscope image data which the user wants to inspect, information indicating the selected microscope image data is transmitted to the image data provision processing unit 307 of the image management server 30.

When the microscope image data is selected by the image display device 40, the image data provision processing unit 307 obtains the selected microscope image data from a predetermined storage region such as the storage unit 311, and provides the obtained data to the image display device 40 which has made the request via the communication control unit 309.

The communication control unit 309 is implemented by, for example, a CPU, a ROM, a RAM, a communication device, and the like. The communication control unit 309 controls communication among the image management server 30, the microscope control device 20, and the image display device 40, performed via the network 3.

The storage unit 311 is an example of a storage device provided in the image management server 30 according to this embodiment. The storage unit 311 stores the microscope image data, various kinds of setting information for controlling the microscope 10 according to this embodiment, various kinds of databases, a lookup table such as the load prediction table, and the like. In addition, the storage unit 311 may store various kinds of history information such as a storage history of the microscope image data and a provision history of the microscope image data. In addition, the storage unit 311 appropriately records various parameters which are necessary to be reserved when the image management server 30 according to this embodiment performs a certain process, or a mid-flow progress of the process, or various kinds of databases or programs.

As above, an example of the function of the image management server 30 according to this embodiment has been described. Each of the above-described constituent elements may be constituted using general members or circuits, or may be constituted by hardware specific to the function of each constituent element. All the functions of the respective constituent elements may be performed by the CPU or the like. Therefore, a configuration to be used may be appropriately modified according to the technical level at the time when this embodiment is practiced.

In addition, a computer program for realizing the respective functions of the image management server 30 according to this embodiment as described above may be prepared and installed in a personal computer or the like. Further, it is possible to provide a recording medium which stores the computer program therein and is readable by a computer. The recording medium includes, for example, a magnetic disk, an optical disc, a magneto-optical disc, a flash memory, and the like. The computer program may be delivered via, for example, a network, without using the recording medium.

Image Processing Method

Next, with reference to FIGS. 14 to 19, the flow of an image processing method performed by the microscope image management system 1 according to this embodiment will be described briefly. FIGS. 14 to 19 are flowcharts illustrating the flow of the image processing method according to this embodiment.

Image Processing Method in Microscope Control Device

Figure 14:
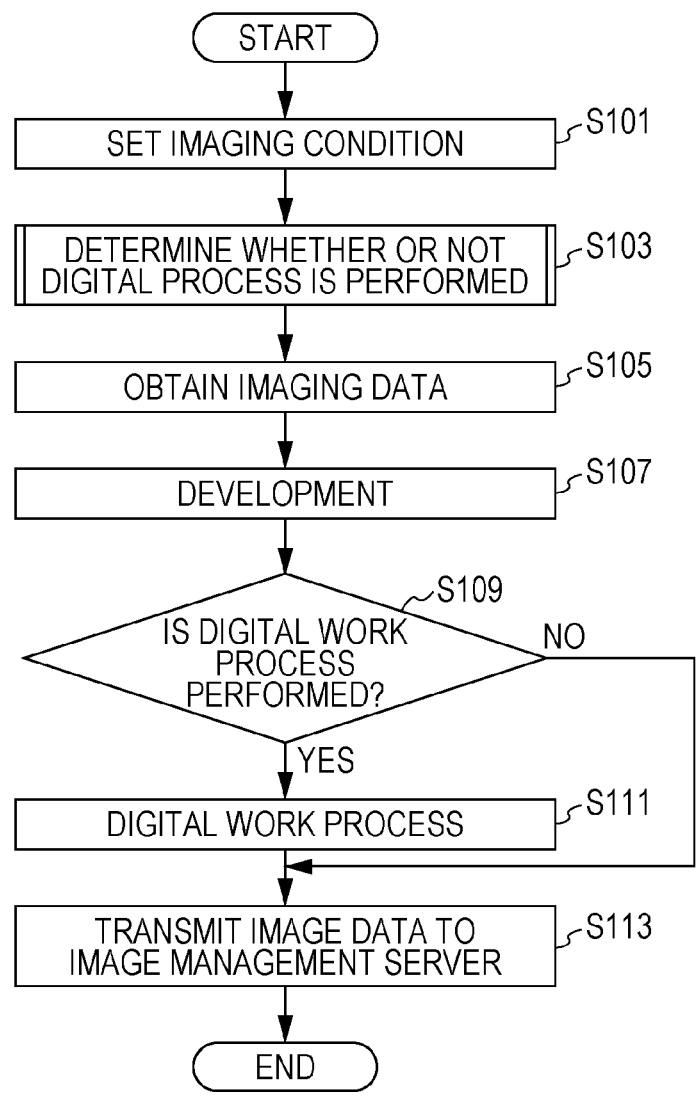
FIG. 14 is a flowchart illustrating a flow of an image processing method according to the same embodiment.

First, with reference to FIGS. 14 and 15, the flow of the image processing method in the microscope control device 20 will be described briefly.

Overall Flow

With reference to 14, the overall flow of the image processing method in the microscope control device 20 will be described.

First, the overall driving control unit 251 of the microscope control device 20 sets an imaging condition for a sample (step S101), and notifies the illumination control unit 203, the stage driving control unit 205, the thumbnail image capturing control unit 207, the enlarged image capturing control unit 209, and the like, of the imaging condition. In addition, the overall driving control unit 251 also notifies the digital work determination unit 253 of the set imaging condition.

The digital work determination unit 253 determines whether or not the digital work process is to be performed by the microscope control device 20 based on the received imaging condition and a load value for the image management server 30 obtained from the image management server 30 (step S103).

On the other hand, the microscope 10 captures a thumbnail image and an enlarged image of a sample based on the received imaging condition. When the image capturing by the microscope 10 is completed, the overall driving control unit 251 obtains data (raw data) corresponding to the captured thumbnail image and data (raw data) corresponding to the captured enlarged image (step S105).

The digital work processing unit 257 performs the development process for the raw data corresponding to the thumbnail image and the raw data corresponding to the enlarged image in response to a request from the overall driving control unit 251 (step S107).

Further, the overall driving control unit 251 checks whether or not the digital work process is to be performed by the microscope control device 20 based on a result of the determination performed by the digital work determination unit 253 (step S109). If the result of the determination performed by the digital work determination unit 253 indicates that the digital work process is to be performed by the microscope control device 20, the overall driving control unit 251 controls the digital work processing unit 257 to perform a predetermined digital work process (step S111). When the predetermined digital work process is completed, the digital work processing unit 257 outputs image data having undergone the digital work process to the overall driving control unit 251.

On the other hand, if the result of the determination performed by the digital work determination unit 253 indicates that the digital work process is not to be performed by the microscope control device 20, the overall driving control unit 251 performs a process in step S113 described later.

The overall driving control unit 251 transmits microscope image data formed by the thumbnail image data and the enlarged image data to the image management server 30 (step S113). At this time, the overall driving control unit 251 adds identification information indicating whether or not the digital work process has been performed by the microscope control device 20, to the header of the enlarged image data. Thereby, the image management server 30 which has obtained the microscope image data can easily determine whether or not the predetermined digital work process has been performed for the obtained enlarged image data.

Flow of Digital Work Determination Process

Figure 15:
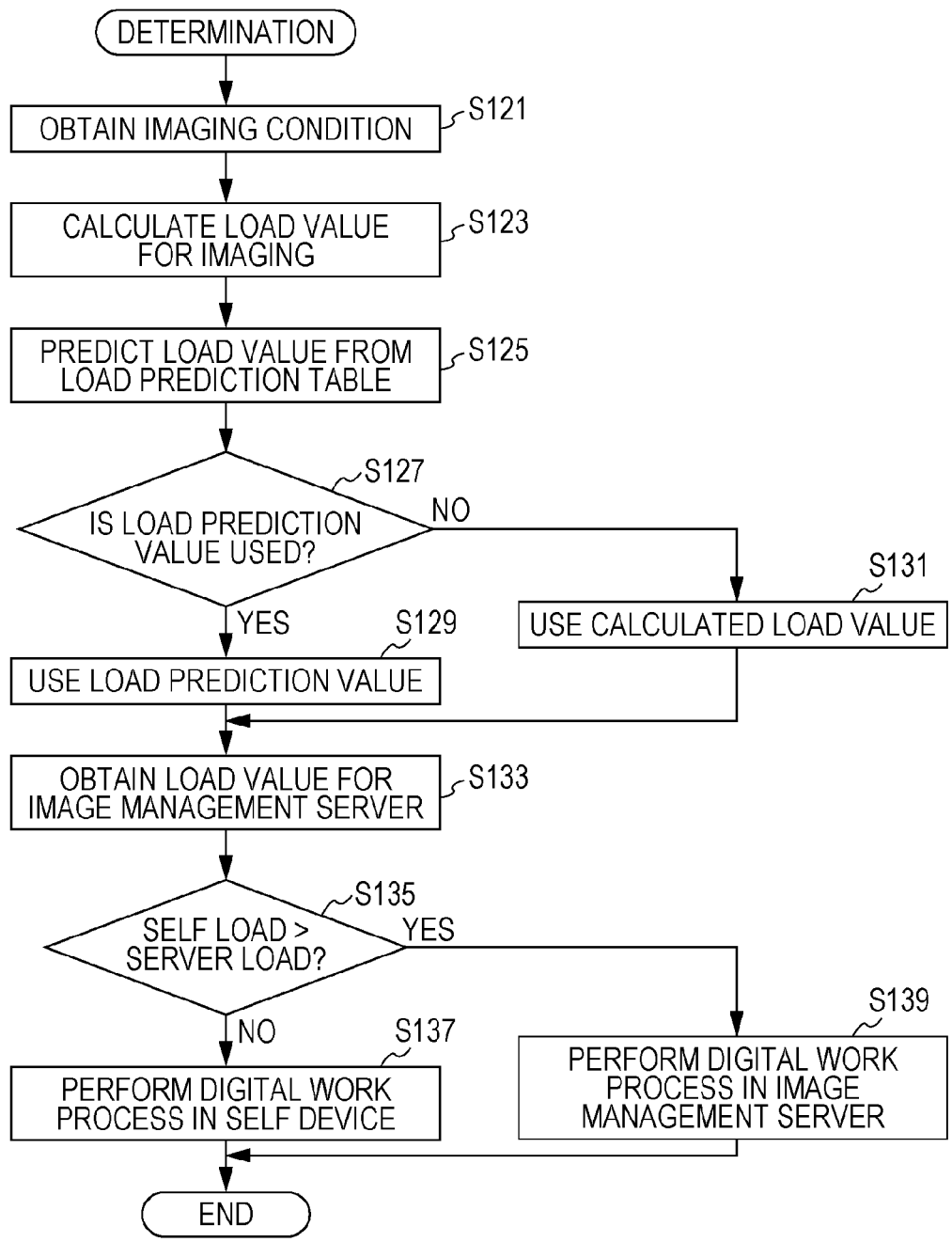
FIG. 15 is a flowchart illustrating a flow of an image processing method according to the same embodiment.

With reference to FIG. 15, the flow of the digital work determination process will be described. When the digital work determination unit 253 obtains the imaging condition from the overall driving control unit 251 (step S121), it notifies the load calculation unit 255 of the obtained imaging condition.

The load calculation unit 255 calculates a load value indicating a load which is necessary for an imaging process (more specifically, a control for the imaging process) by the use of the received imaging condition (step S123). In addition, the digital work determination unit 253 predicts a load value by the use of the load prediction table stored in the storage unit 211 (step S125).

The load calculation unit 255 determines whether or not the load prediction value (the load value calculated using the load prediction table) is used based on setting information which is set in advance by a user or by a user's operation (step S127). If the load prediction value is used, the load calculation unit 255 uses the load prediction value as a load value for the microscope control device 20 (step S129). Further, if the load prediction value is not used, the load calculation unit 255 uses the calculated load value as a load value for the microscope control device 20 (step S131). Thereafter, the load calculation unit 255 outputs the calculated load value and the load prediction value to the digital work determination unit 253.

The digital work determination unit 253 requests the image management server 30 to provide a load value for the corresponding server via the overall driving control unit 251 and the communication control unit 259. Thereby, the load calculation unit 255 obtains the load value for the image management server 30 (step S133).

Next, the digital work determination unit 253 determines whether or not the self load value (the load value for the microscope control device 20) exceeds the load value for the image management server 30 (step S135). If the self load value is equal to or less than the load value for the image management server 30, the digital work determination unit 253 determines that the digital work process is to be performed by the device itself (step S137). On the other hand, if the self load value exceeds the load value for the image management server 30, the digital work determination unit 253 determines that the digital work process is to be performed by the image management server 30 (step S139).

Image Processing Method in Image Management Server

First, with reference to FIGS. 16 and 17, the flow of the image processing method in the image management server 30 will be described briefly.

Load Calculation Process

Figure 16:
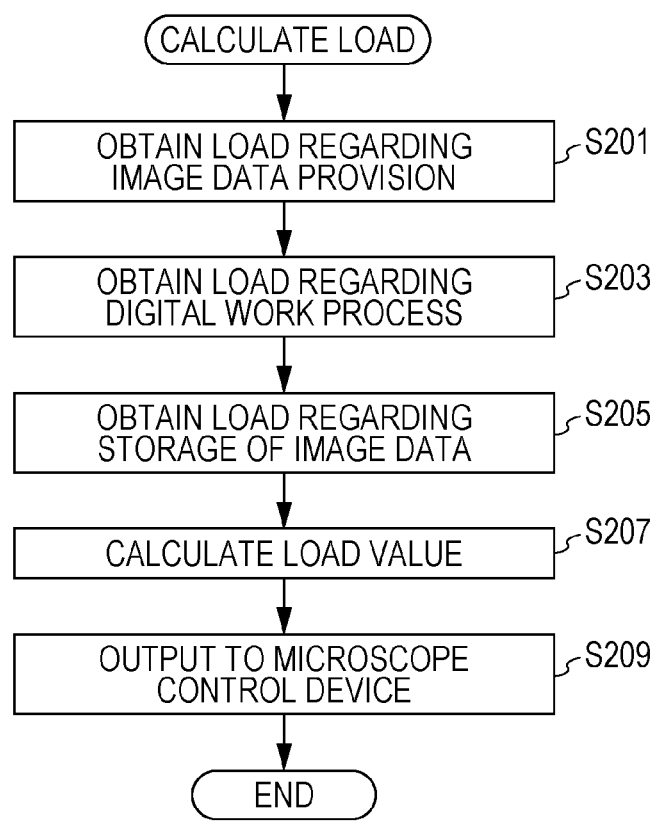
FIG. 16 is a flowchart illustrating a flow of an image processing method according to the same embodiment.
Figure 17:
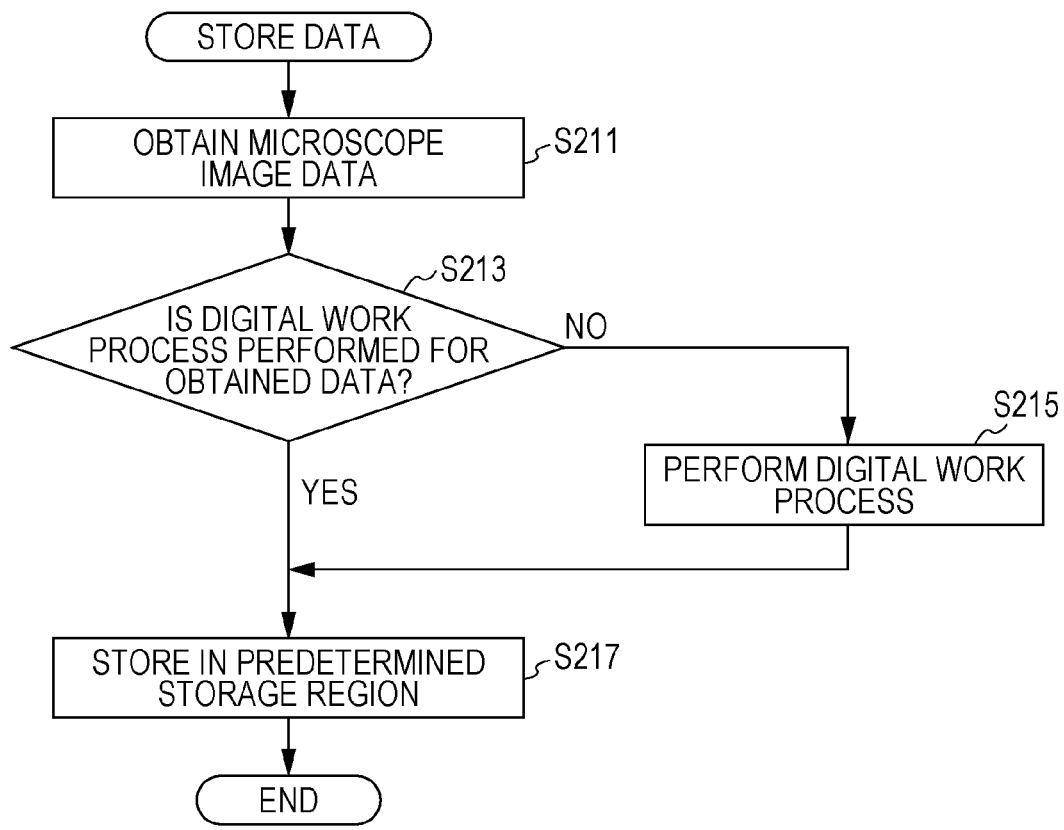
FIG. 17 is a flowchart illustrating a flow of an image processing method according to the same embodiment.

With reference to FIG. 16, the flow of the load calculation process in the image management server 30 will be described. When a request for providing a load value is made by the microscope control device 20, first, the load calculation unit 301 of the image management server 30 requests the image data provision processing unit 307 to provide a load regarding a provision of image data, and obtains a load value necessary for the image data provision process for the image data provision processing unit 307 (step S201). In addition, the load calculation unit 301 requests the digital work processing unit 305 to provide a load necessary for the digital work process, and obtains a load value necessary for the digital work process from the digital work processing unit 305 (step S203). Further, the load calculation unit 301 requests the image data storage processing unit 303 to provide a load regarding a storage of image data, and obtains a load value regarding the storage of image data from the image data storage processing unit 303 (step S205).

The order where the load calculation unit 301 obtains the load values from the respective processing units is not limited to the above-described order, but the obtaining of the load values may be performed in an arbitrary order, and the load values may be obtained from the respective processing units at the same time.

Thereafter, the load calculation unit 301 calculates a load value for the image management server 30 by the use of the load values obtained from the respective processing units (step S207). Next, the load calculation unit 301 outputs the calculated load value to the microscope control device 20 (step S209).

Image Data Storage Process

Next, the flow of the image data storage process will be described with reference to FIG. 17. When the image data storage processing unit 303 obtains the microscope image data from the microscope control device 20 (step S211), it refers to the header of the enlarged image data and determines whether or not a digital work process has been performed for the obtained data (step S213).

If the digital work process has not been performed, the image data storage processing unit 303 requests the digital work processing unit 305 to perform a predetermined digital work process. The digital work processing unit 305 performs the predetermined digital work process for the obtained enlarged image data (step S215).

If the digital work process has been performed, the image data storage processing unit 303 stores the obtained microscope image data in a predetermined storage region (step S217).

Example of Flow of Process in Microscope Image Management System

Next, with reference to FIGS. 18 and 19, an example of the process flow in the microscope image management system 1 will be described.

Figure 18:
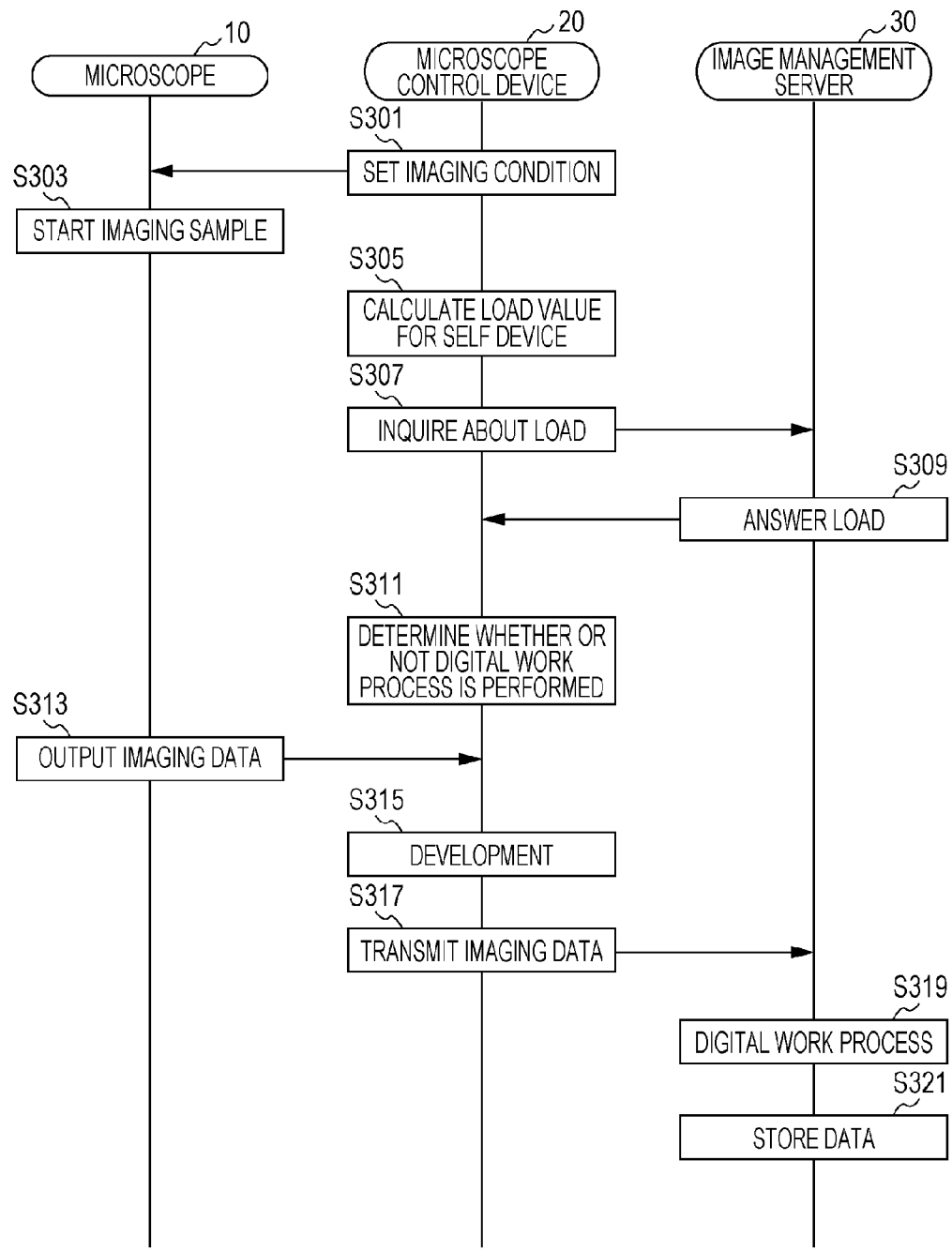
FIG. 18 is a flowchart illustrating a flow of an image processing method according to the same embodiment.

First, FIG. 18 is referred to. The overall driving control unit 251 of the microscope control device 20 sets an imaging condition for a certain sample (step S301), sets the imaging condition in the microscope 10, and notifies the digital work determination unit 253 of the imaging condition.

The microscope 10 starts imaging the sample based on the received imaging condition (step S303).

On the other hand, the load calculation unit 255 of the microscope control device 20 calculates a load of the device itself based on the received imaging condition (step S305), and outputs the calculated load to the digital work determination unit 253. The digital work determination unit 253 inquires a load of the image management server 30 (step S307). The load calculation unit 301 of the image management server 30 calculates a load of the image management server 30, and responds to the request from the microscope control device 20 (step S309).

Thereafter, the digital work determination unit 253 determines whether or not a digital work process is to be performed using the calculated load value and the load value obtained from the image management server 30 (step S311). Here, it is assumed that a load of the self device has a value of 2.0 at a predetermined unit (for example, the load average), and a load of the image management server 30 has a value of 1.0 at the same unit. In this case, the digital work determination unit 253 determines that the load of the image management server 30 is relatively low, and determines that the digital work process is to be performed by the image management server 30.

On the other hand, when the microscope 10 completes the imaging of the sample, it outputs the obtained imaging data to the microscope control device 20 (step S313). The overall driving control unit 251 requests the digital work processing unit 257 to perform a development process for the obtained imaging data, and the digital work processing unit 257 performs the development process for the imaging data (step S315). Thereafter, the overall driving control unit 251 adds identification information indicating that the digital work process has not been performed for the imaging data, and uploads the imaging data to the image management server 30 (step S317).

When obtaining the imaging data, the image data storage processing unit 303 of the image management server 30 refers to the header of the enlarged image data and specifies that the digital work process has not been performed. Next, the digital work processing unit 305 of the image management server 30 performs a predetermined digital work process for the obtained image data (step S319). Thereafter, the image data storage processing unit 303 stores the data having undergone the digital work process in a predetermined storage region (step S321).

Figure 19:
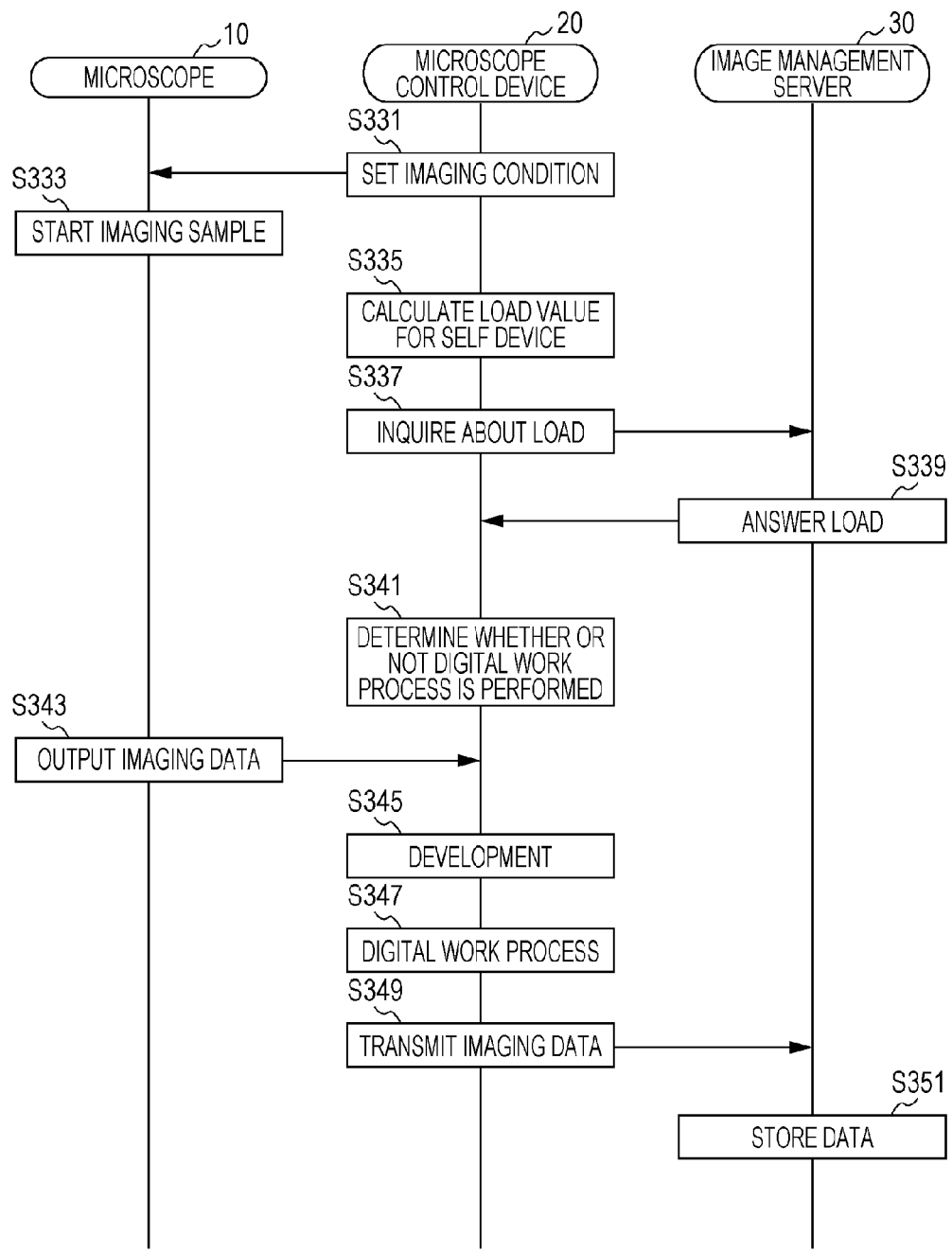
FIG. 19 is a flowchart illustrating a flow of an image processing method according to the same embodiment.

Next, FIG. 19 is referred to. The overall driving control unit 251 of the microscope control device 20 sets an imaging condition for a certain sample (step S331), sets the imaging condition in the microscope 10, and notifies the digital work determination unit 253 of the imaging condition.

The microscope 10 starts imaging the sample based on the received imaging condition (step S333).

On the other hand, the load calculation unit 255 of the microscope control device 20 calculates a load of the self device based on the received imaging condition (step S335), and outputs the calculated load to the digital work determination unit 253. The digital work determination unit 253 inquires a load of the image management server 30 (step S337). The load calculation unit 301 of the image management server 30 calculates a load of the image management server 30, and responds to the request from the microscope control device 20 (step S339).

Thereafter, the digital work determination unit 253 determines whether or not a digital work process is to be performed using the calculated load value and the load value obtained from the image management server 30 (step S341). Here, it is assumed that a load of the self device has a value of 1.0 at a predetermined unit (for example, the load average), and a load of the image management server 30 has a value of 2.0 at the same unit. In this case, the digital work determination unit 253 determines that the load of the self device is relatively low, and determines that the digital work process is to be performed by the microscope control device 20.

On the other hand, when the microscope 10 completes the imaging process of the sample, it outputs the obtained imaging data to the microscope control device 20 (step S343). The overall driving control unit 251 requests the digital work processing unit 257 to perform a development process for the obtained imaging data, and the digital work processing unit 257 performs the development process for the imaging data (step S345).

The digital work processing unit 257 performs a predetermined digital work process for the enlarged image data (step S347). Next, the overall driving control unit 251 adds identification information indicating that the digital work process has been performed on the imaging data, and uploads the imaging data to the image management server 30 (step S349).

When obtaining the imaging data, the image data storage processing unit 303 of the image management server 30 refers to the header of the enlarged image data and specifies that the digital work process has been performed. Next, the image data storage processing unit 303 stores the data having undergone the digital work process in a predetermined storage region (step S351).

In addition, in FIGS. 18 and 19, although the obtaining of the loads is shown so as to be synchronized with the imaging process for convenience, it is not limited to this example, and the obtaining of the loads may be not synchronized with the imaging process.

Process for Changing Order of Tile Images to be Stored

Figure 20:
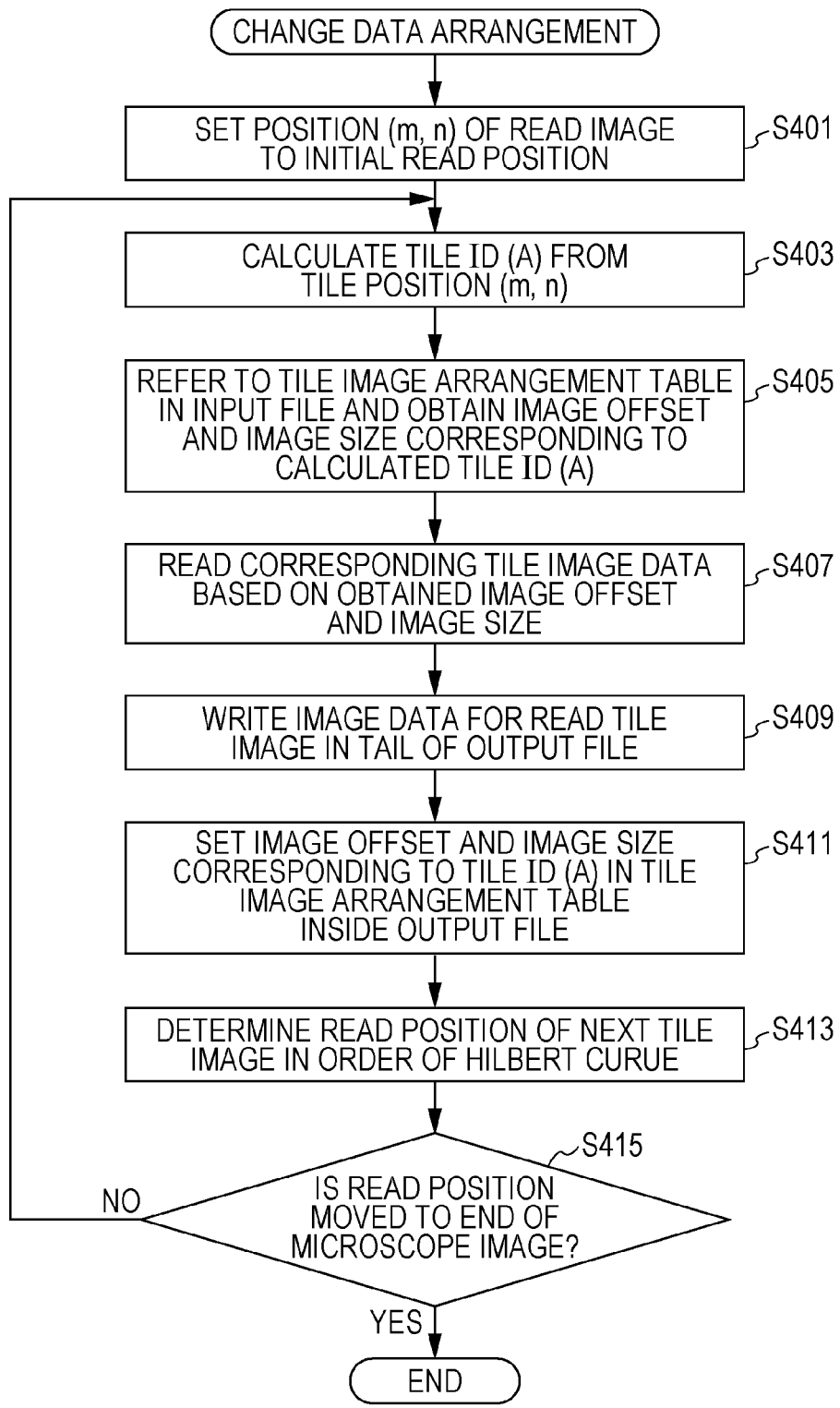
FIG. 20 is a flowchart illustrating a flow of a process for changing the order of tile images to be stored according to the same embodiment.

Next, with reference to FIG. 20, the flow of the process for changing the order of tile images to be stored, which is an example of the digital work process, will be described briefly. FIG. 20 is a flowchart illustrating the flow of the process for changing the order of tile images to be stored according to this embodiment.

Hereinafter, although a case where the digital work processing unit 257 of the microscope control device 20 performs the process for changing the order of tile images to be stored is described, the process is performed by the same flow in a case where the process for changing the order of tile images to be stored is performed in the image management server 30 as well.

Before the following description, it is assumed that the digital work processing unit 257 gives a tile ID to each of a plurality of tile images forming a microscope image, then generates a tile image arrangement table according to the tile IDs, and generates the input file as shown in FIG. 10. In addition, it is assumed that the digital work processing unit 257 performs a calculation process of the Hilbert curve for tile images forming a noted microscope image.

First, the digital work processing unit 257 sets a position (m, n) of a read tile image to an initial read position (that is, a position represented by (0, 0)), for the microscope image data of which the order of tile images to be stored is changed (step S401).

Next, the digital work processing unit 257 calculates a tile ID (the tile ID is denoted by A in the figure) of a tile image corresponding to the position based on the set tile position (m, n) (step S403). The digital work processing unit 257 uses, for example, Equation 101 as described above in calculating the tile ID.

Next, the digital work processing unit 257 refers to the tile image arrangement table in the input file, and obtains image offset and an image size corresponding to the calculated tile ID (step S405).

The digital work processing unit 257 refers to the microscope image data based on the obtained image offset and image size and reads the corresponding tile image data (step S407). Next, the digital work processing unit 257 writes image data for the read tile image in the tail of an output file (step S409). Thereafter, the digital work processing unit 257 sets an image offset and an image size corresponding to the noted tile ID in the tile image arrangement table inside the output file (step S411). Thereby, the tile image data is recorded at the appropriate position of the output file, and the parameters used to read the tile images are described in the tile image arrangement table.

Next, the digital work processing unit 257 sets a position of a next read tile image in order of the calculated Hilbert curve (step S413). In other words, the digital work processing unit 257 specifies a tile image adjacent to the noted tile image on the Hilbert curve, and sets a position corresponding to this tile image as the next read position.

Thereafter, the digital work processing unit 257 determines whether or not the read position is moved up to the end of a microscope image (step S415). If the read position is not moved up to the end of the microscope image, the flow returns to step S403, where the digital work processing unit 257 performs the process. In addition, if the read position is moved up to the end of the microscope image, the digital work processing unit 257 finishes the process for changing the order of data to be stored.

The process is performed along the flow as described above, and thereby the microscope image data formed by a plurality of tile images is stored in the order of the Hilbert curve so as to be positioned substantially at the same distance between each other in the storage region.

Hardware Configuration

Figure 21:
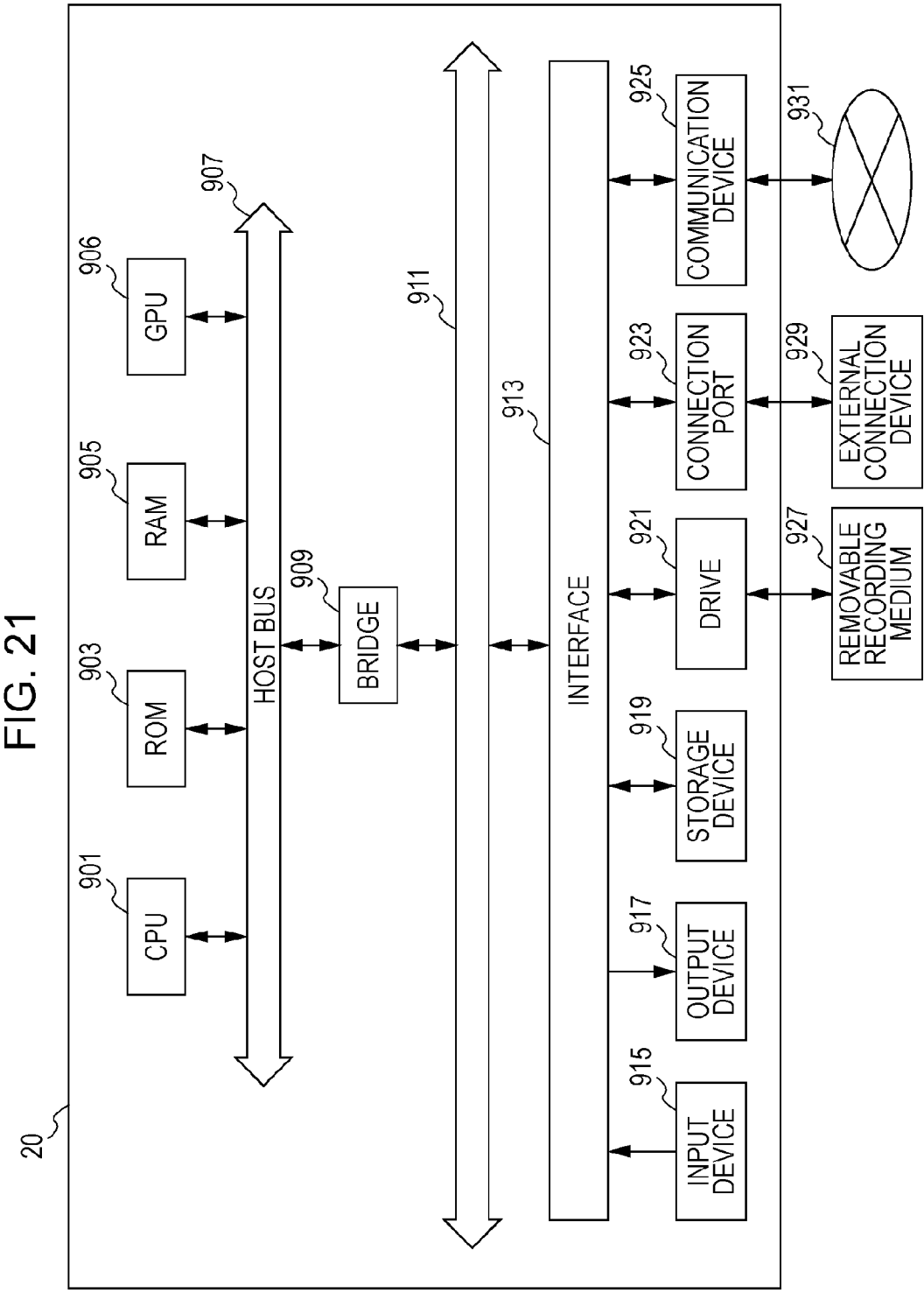
FIG. 21 is a block diagram illustrating a hardware configuration of the microscope control device according to an embodiment.

A hardware configuration of the microscope control device 20 according to this embodiment will be described in detail with reference to FIG. 21. FIG. 21 is a block diagram illustrating a hardware configuration of the microscope control device 20 according to this embodiment.

The microscope control device 20 mainly includes a CPU 901, a ROM 903, a RAM 905, and a GPU (Graphics Processing Unit) 906. In addition, the microscope control device 20 also includes a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control device, and controls the whole operation of the microscope control device 20 or a portion thereof according to various kinds of programs recorded in the ROM 903, the RAM 905, the storage device 919, or a removable recording medium 927. The ROM 903 stores programs or operational parameters used by the CPU 901. The RAM 905 primarily stores programs used by the CPU 901, parameters which are appropriately varied in executing the programs, or the like. In addition, the GPU 906 functions as an arithmetic processing unit and a control device which performs an arithmetic process regarding various kinds of image processes performed in the microscope control device 20. The GPU 906 controls all operations of the image processes in the microscope control device 20 or a portion thereof according to various kinds of programs recorded in the ROM 903, the RAM 905, the storage device 919, or a removable recording medium 927. They are connected to each other via the host bus 907 formed by internal buses such as a CPU bus.

The host bus 907 is connected to the external bus 911 such as a PCI (Peripheral Component Interconnect/Interface) bus via the bridge 909.

The input device 915 is an operation device which is operated by a user, such as, for example, a mouse, a keyboard, a touch panel, a button, a switch, and a lever. In addition, the input device 915 may be, for example, a remote control device (a so-called remote controller) using infrared rays or other electric waves, or may be an external connection device 929 such as a mobile phone or a PDA supporting the operation of the microscope control device 20. Further, the input device 915 is constituted by, for example, an input control circuit or the like, which generates an input signal based on information input by a user using the operation device and outputs the input signal to the CPU 901. A user can input various kinds of data to the microscope control device 20 or instruct the microscope control device 20 to perform processes by operating the input device 915.

The output device 917 includes devices which can notify a user of obtained information in a visible or audible manner. These devices include display devices such as CRT display devices, liquid crystal displays, plasma display panels, EL displays, and lamps, audio output devices such as speakers and headphones, printer devices, mobiles phones, facsimiles, and the like. The output device 917 outputs, for example, results obtained by various kinds of processes performed by the microscope control device 20. Specifically, the display device displays results obtained by various kinds of processes performed by the microscope control device 20, as a text or an image. On the other hand, the audio output device converts an audio signal including reproduced audio data, sound data, or the like into an analog signal so as to be output.

The storage device 919 is a device for storing data, which is formed as an example of a storage unit of the microscope control device 20. The storage device 919 includes, for example, a magnetic storage device such as an HDD (Hard Disk Drive), a semiconductor storage device, an optical storage device, a magneto-optical storage device, and the like. The storage device 919 stores programs or various kinds of data executed by the CPU 901, various kinds of data obtained from an external device, and the like.

The drive 921 is a reader and writer for a recording medium, and is embedded in or installed outside the microscope control device 20. The drive 921 reads information recorded in the removable recording medium 927 such as a magnetic disk, an optical disc, a magneto-optical disc, or a semiconductor memory, which is installed, and outputs the read information to the RAM 905. In addition, the drive 921 can write information in the removable recording medium 927 such as a magnetic disk, an optical disc, a magneto-optical disc, or a semiconductor memory, which is installed. The removable recording medium 927 includes, for example, a DVD medium, an HD-DVD medium, a Blu-ray medium, and the like. In addition, the removable recording medium 927 may be a Compact Flash (CF, registered trademark), a flash memory, an SD (Secure Digital) memory card, or the like. Further, the removable recording medium 927 may be, for example, an IC (Integrated Circuit) card, an electronic apparatus mounting a non-contact IC chip thereon, or the like.

The connection port 923 is used to directly connect a device to the microscope control device 20. An example of the connection port 923 includes a USB (Universal Serial Bus) port, an IEEE1394 port, an SCSI (Small Computer System Interface) port, and the like. Other examples of the connection port 923 include an RS-232C port, an optical audio terminal, an HDMI (High-Definition Multimedia Interface) port, and the like. The external connection device 929 is connected to the connection port 923, and thereby the microscope control device 20 directly obtains various kinds of data from the external connection device 929 or provides various kinds of data to the external connection device 929.

The communication device 925 is, for example, a communication interface constituted by a communication device and the like for connection to a communication network 931. The communication device 925 may be, for example, a communication card or the like for a wired or wireless LAN (Local Area Network), Bluetooth (registered trademark), or a WUSB (Wireless USB). In addition, the communication device 925 may be a router for optical communication, a router for ADSL (Asymmetric Digital Subscriber Line), a modem for various kinds of communication, or the like. This communication device 925 can transmit and receive a signal to and from, for example, the Internet or other communication devices, based on a predetermined protocol such as, for example, TCP/IP. In addition, the communication network 931 connected to the communication device 925 is formed by a network or the like connected in a wired or wireless manner, and may be, for example, the Internet, a home LAN, infrared communication, radio wave communication, various kinds of dedicated communication, satellite communication, or the like.

As such, an example of the hardware configuration capable of realizing the function of the microscope control device 20 according to this embodiment has been described. Each of the above-described constituent elements may be constituted using general members, or may be constituted by hardware specific to the function of each constituent element. Therefore, a hardware configuration to be used may be appropriately modified according to the technical level at the time when this embodiment is practiced.

The image management server 30 according to this embodiment has the same hardware configuration as the microscope control device 20 according to this embodiment, and thus the description thereof will be omitted.

Conclusion

As described above, in the microscope control device and the image management server according to the embodiment, it is possible to select a device which performs a digital work process for the microscope image depending on loads of the microscope control device and the image management server. Thereby, the digital work process is performed by a device having a relatively low load, and thus it is possible to more directly inspect a captured microscope image on the image display device which is a terminal. In addition, the load sharing can be efficiently performed, and thereby it is possible to rapidly capture an image of a sample.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A microscope control device comprising:
a driving control unit that controls driving of a microscope which captures a digital enlarged image of a predetermined sample;
a load calculation unit that generates a microscope control device load value representing a load which is necessary for the capturing process of the digital enlarged image;
a digital work determination unit that compares the microscope control device load value obtained from the load calculation unit with an image management server load value obtained from an image management server, wherein the image management server load value represents a load necessary for processing the digital enlarged image at the image management server; and
a digital work processing unit that, when requested by the digital work determination unit, performs a predetermined digital work process for the captured digital enlarged image if the load value obtained by the load calculation unit is lower than the load value obtained from the image management server, wherein the digital work determination unit determines that the predetermined digital work process is to be performed by the image management server if the load value obtained by the load calculation unit is higher than the load value obtained from the image management server.

2. The microscope control device according to claim 1, wherein the load calculation unit generates the microscope control device load value based on at least one of a capturing condition for the digital enlarged image obtained from the driving control unit and
a load value prediction table provided in advance.

3. The microscope control device according to claim 2, wherein the digital work processing unit, when requested by the digital work determination unit, performs the predetermined digital work process comprising a conversion process for the captured digital enlarged image.

4. The microscope control device according to claim 2, wherein the digital enlarged image of the predetermined sample includes a plurality of digital images, and
wherein the predetermined digital work process comprises changing arrangements of the plurality of digital images such that the plurality of digital images is positioned substantially at the same distance between each other in a storage region of the image management server.

5. The microscope control device according to claim 1, wherein the digital work determination unit requests the digital work processing unit to perform the predetermined digital work process if the microscope control device load value is lower than the image management server load value, and
wherein the driving control unit outputs data for the digital enlarged image having undergone the predetermined digital work process to the server along with identification information indicating that the predetermined digital work process has been performed.

6. The microscope control device according to claim 1, wherein the digital work determination unit determines that the predetermined digital work process is to be performed by the image management server if the microscope control device load value is higher than the image management server load value,
wherein the driving control unit outputs the data for the digital enlarged image not having undergone the predetermined digital work process to the server along with identification information indicating that the predetermined digital work process has not been performed.

7. An image management server comprising:
an image data storage processing unit that obtains data for a digital enlarged image of a predetermined sample captured by a microscope and stores the obtained data in a predetermined storage region;
a load calculation unit that, prior to the image management server obtaining the obtained digital enlarged image data, provides an image management server load value to a microscope control device;
an image data provision processing unit that provides the data for the digital enlarged image stored in the predetermined storage region to an external device; and
a digital work processing unit that performs a predetermined digital work process for the digital enlarged image when the image data storage processing unit determines that the predetermined digital work process has not been performed and requests that the digital work processing unit perform the predetermined digital work process.

8. The image management server according to claim 7, wherein the load calculation unit
calculates the image management server load value as a sum total of loads necessary for a data storage process for storing the data for the digital enlarged image, a data provision process for providing the stored data for the digital enlarged image, and performing the predetermined digital work process, and
outputs the calculated sum total of the loads to the microscope control device which controls the microscope.

9. The image management server according to claim 7, wherein the digital work processing unit performs a conversion process for the captured digital enlarged image as the digital work process.

10. The image management server according to claim 7, wherein the digital enlarged image of the predetermined sample includes a plurality of digital images, and
wherein the digital work processing unit changes arrangements of the plurality of digital images such that the plurality of digital images is positioned substantially at the same distance between each other in the predetermined storage region as the digital work process.

11. An image processing method comprising:
a microscope control device generating a microscope control device load value representing a load which is necessary for a capturing process of a digital enlarged image corresponding to a predetermined sample by a microscope;
the microscope control device obtaining an image management server load value for a server which stores the digital enlarged image corresponding to the predetermined sample; and
the microscope control device determining whether or not a predetermined digital work process is performed by the microscope control device for the digital enlarged image based on a comparison of the microscope control device load value and the image management server load value, wherein the predetermined digital work process is performed by the microscope control device if the microscope control device load value is lower than the image management server load value, and the predetermined digital work process is performed by the image management server if the microscope control device load value is higher than the image management server load value.

12. An image processing method comprising:
an image management server providing an image management server load value to a microscope control device;
the image management server obtaining data for a digital enlarged image of a predetermined sample captured by a microscope controlled by the microscope control device;
the image management server determining whether or not a predetermined digital work process has been performed based on identification information provided as part of the obtained data for the digital enlarged image;
the image management server performing the predetermined digital work process for the digital enlarged image when an image data storage processing unit of the image management server determines that the predetermined digital work process has not been performed and requests that a digital work processing unit of the image management server perform the predetermined digital work process; and
storing in a storage unit data for the digital enlarged image having undergone the predetermined digital work process in a predetermined storage region.

13. A non-transitory computer readable medium storing a computer readable program for controlling a microscope capturing a digital enlarged image of a predetermined sample, the computer readable program structured to cause the apparatus to:
control driving of the microscope to generate a captured digital enlarged image;
calculate a microscope control device load value representing the load necessary for the capturing process of the digital enlarged image;
obtain an image management server load value from an image management server;
determine whether or not a predetermined digital work process is to be performed based on a comparison of the microscope control device load value and the image management server load value;
perform the predetermined digital work process for the captured digital enlarged image based on the comparison of the microscope control device load value and the image management server load value, wherein the predetermined digital work process is performed by the microscope control device if the microscope control device load value is lower than the image management server load value, and the predetermined digital work process is performed by the image management server if the microscope control device load value is higher than the image management server load value; and
output digital enlarged image data from the microscope control device to the image management server.

14. A non-transitory computer readable medium storing a computer readable program for controlling an image management server connected to another information processing apparatus over a network, the computer readable program structured to cause the apparatus to:
obtain data for a digital enlarged image of a predetermined sample captured by a microscope and store the obtained data in a predetermined storage region;
provide an image management server load value to a microscope control device prior to obtaining the digital enlarged image data;
provide the data for the digital enlarged image stored in the predetermined storage region to an external device; and
perform a predetermined digital work process for the digital enlarged image when an image data storage processing unit of the image management server determines that the predetermined digital work process has not been performed and requests that a digital work processing unit of the image management server perform the predetermined digital work process.

15. An image management system comprising:
a microscope control device including
a driving control unit that controls driving of a microscope which captures a digital enlarged image of a predetermined sample and outputs digital enlarged image data to an external image management server;
a load calculation unit that calculates a microscope control device load value representing a load which is necessary for the capturing process of the digital enlarged image;
a digital work determination unit that determines whether or not a predetermined digital work process is to be performed based on a comparison of the microscope control device load value calculated by the load calculation unit and an image management server load value for the corresponding server obtained from the server; and
a digital work processing unit that, when requested by the digital work processing unit, performs a digital work process for the captured digital enlarged image based on the comparison of the microscope control device load value and the image management server load value;
the image management server including
an image data storage processing unit that obtains data for a digital enlarged image of a predetermined sample captured by a microscope and stores the obtained data in a predetermined storage region;
a load calculation unit that, prior to the image management server obtaining the obtained digital enlarged image data, provides an image management server load value to a microscope control device;
an image data provision processing unit that provides the data for the digital enlarged image stored in the predetermined storage region to an external device;
a digital work processing unit that performs a predetermined digital work process for the digital enlarged image when the image data storage processing unit determines that the predetermined digital work process has not been performed and requests that a digital work processing unit of the image management server perform the predetermined digital work process.

\* \* \* \* \*